US012107326B2

(12) United States Patent
Parrow et al.

(10) Patent No.: US 12,107,326 B2
(45) Date of Patent: Oct. 1, 2024

(54) COMPACT ANTENNA SYSTEM FOR MUNITION

(71) Applicant: Northrop Grumman Systems Corporation, Falls Church, VA (US)

(72) Inventors: Jacob M. Parrow, Chaska, MN (US); Robert A. Sainati, Bloomington, MN (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 184 days.

(21) Appl. No.: 17/825,389

(22) Filed: May 26, 2022

(65) Prior Publication Data

US 2023/0065918 A1 Mar. 2, 2023

Related U.S. Application Data

(63) Continuation of application No. 16/873,057, filed on Jan. 23, 2020, now Pat. No. 11,349,201.

(60) Provisional application No. 62/918,296, filed on Jan. 24, 2019.

(51) Int. Cl.

| | |
|---|---|
| ***H01Q 1/28*** | (2006.01) |
| ***H01Q 1/52*** | (2006.01) |
| ***H01Q 11/08*** | (2006.01) |
| ***H01Q 19/10*** | (2006.01) |

(52) U.S. Cl.

CPC ............... *H01Q 1/28* (2013.01); *H01Q 1/525* (2013.01); *H01Q 11/08* (2013.01); *H01Q 19/106* (2013.01)

(58) Field of Classification Search

None

See application file for complete search history.

(56) References Cited

U.S. PATENT DOCUMENTS

| | | | |
|---|---|---|---|
| 2,270,314 | A | 1/1942 | Kraus |
| 2,511,611 | A | 6/1950 | Wheeler |
| 3,111,080 | A | 11/1963 | French et al. |
| 3,745,583 | A | 7/1973 | Herbert |
| 4,373,688 | A | 2/1983 | Topliffe |

(Continued)

FOREIGN PATENT DOCUMENTS

| | | |
|---|---|---|
| GB | 2334323 | 8/1999 |
| WO | WO2016146339 | 9/2016 |

OTHER PUBLICATIONS

Aijaz, Zarreen et al., "Effect of the Different Shapes: Aperture Coupled Microstrip Slot Antenna", International Journal of Electronics Engineering, 2(1), 2010, pp. 103-105.

(Continued)

*Primary Examiner* — Jany Richardson

(74) *Attorney, Agent, or Firm* — Christensen, Fonder, Dardi & Herbert PLLC

(57) ABSTRACT

A compact munition antenna system that includes a curvilinear transmit antenna on a top and bottom of a ring-shaped substrate, and a curvilinear receive antenna on the top and bottom of the substrate. The transmit antenna and receive antenna are positioned opposite one another on the substrate, and are separated by a pair of isolation barriers to reduce coupling of the two antennas. The munition antenna system may be mounted on a metal cylindrical portion of a guidance system in a nose section of the munition, using a vertical convex surface of the cylindrical portion and a horizontal surface of the munition as a reflector for improving antenna performance.

17 Claims, 9 Drawing Sheets

(56) References Cited

U.S. PATENT DOCUMENTS

| | | | | |
|---|---|---|---|---|
| 4,438,893 | A | 3/1984 | Sands et al. | |
| 4,512,537 | A | 4/1985 | Sebestyen et al. | |
| 4,537,371 | A | 8/1985 | Lawhorn et al. | |
| 4,554,554 | A | 11/1985 | Olesen et al. | |
| 4,568,039 | A | 2/1986 | Smith et al. | |
| 5,268,680 | A | 12/1993 | Zantos | |
| 5,425,514 | A | 6/1995 | Grosso | |
| 5,696,347 | A | 12/1997 | Sebeny, Jr. et al. | |
| 5,708,446 | A | 1/1998 | Laramie | |
| 5,734,389 | A | 3/1998 | Bruce et al. | |
| 5,788,178 | A | 8/1998 | Barrett, Jr. | |
| 6,098,547 | A | 8/2000 | West | |
| 6,133,879 | A | 10/2000 | Grangeat et al. | |
| 6,204,801 | B1 | 3/2001 | Sharka et al. | |
| 6,314,886 | B1 | 11/2001 | Kuhnle et al. | |
| 6,345,785 | B1 | 2/2002 | Harkins et al. | |
| 6,389,974 | B1 | 5/2002 | Foster | |
| 6,422,507 | B1 | 7/2002 | Lipeles | |
| 6,473,041 | B2 | 10/2002 | Koch et al. | |
| 6,502,786 | B2 | 1/2003 | Rupert et al. | |
| 6,597,316 | B2 | 7/2003 | Rao et al. | |
| 6,615,734 | B2 | 9/2003 | Koch et al. | |
| 6,653,972 | B1 | 11/2003 | Krikorian et al. | |
| 6,834,591 | B2 | 12/2004 | Rwcliffe et al. | |
| 6,981,672 | B2 | 1/2006 | Clancy et al. | |
| 7,098,841 | B2 | 8/2006 | Hager et al. | |
| 7,151,509 | B2 | 12/2006 | Massey et al. | |
| 7,412,930 | B2 | 8/2008 | Smith et al. | |
| 7,431,237 | B1 | 10/2008 | Mock et al. | |
| 7,548,202 | B1 | 6/2009 | Jennings | |
| 7,631,833 | B1 | 12/2009 | Ghaleb et al. | |
| 7,652,753 | B1 * | 1/2010 | Stephens | F41G 7/2293 250/203.1 |
| 7,781,709 | B1 | 8/2010 | Jones et al. | |
| 7,849,797 | B2 | 12/2010 | Geswender et al. | |
| 7,849,800 | B2 | 12/2010 | Hinsdale et al. | |
| 7,947,936 | B1 | 5/2011 | Bobinchak et al. | |
| 8,063,347 | B1 | 11/2011 | Urbano et al. | |
| 8,077,099 | B1 | 12/2011 | Wesh et al. | |
| 8,138,982 | B1 | 3/2012 | West et al. | |
| 8,319,164 | B2 | 11/2012 | Martinez | |
| 8,432,310 | B1 | 4/2013 | Pogemiller et al. | |
| 8,508,404 | B1 | 8/2013 | Wilmhoff | |
| 8,542,153 | B2 | 9/2013 | Owens | |
| 8,552,349 | B1 | 10/2013 | Alexander | |
| 8,716,639 | B2 * | 5/2014 | Mallon | F42B 10/46 244/3.11 |
| 8,757,064 | B2 | 6/2014 | Jennings et al. | |
| 8,773,300 | B2 * | 7/2014 | Stratis | F41G 7/2246 342/54 |
| 8,916,810 | B2 | 12/2014 | Geswender et al. | |
| 9,683,814 | B2 | 6/2017 | Dryer | |
| 9,709,372 | B2 | 7/2017 | Edwards | |
| 10,288,395 | B1 | 5/2019 | Barton | |
| 10,355,349 | B2 * | 7/2019 | Rojanski | G01S 13/865 |
| 11,349,201 | B1 | 5/2022 | Parrow et al. | |
| 2005/0184920 | A1 | 8/2005 | Mahler et al. | |
| 2007/0069968 | A1 | 3/2007 | Moller et al. | |
| 2008/0036657 | A1 | 2/2008 | Oomuro | |
| 2010/0097275 | A1 | 4/2010 | Parsche et al. | |
| 2017/0172701 | A1 | 6/2017 | Kube et al. | |
| 2018/0166791 | A1 | 6/2018 | Kim et al. | |

OTHER PUBLICATIONS

Bao, X.L. et al., "Compact Concentric Annular-Ring Patch Antenna for Triple Frequency Operation", Electronics Letters, vol. 42, No. 20, Sep. 28, 2006, 2 pages.

Carver, Keith R. et al., "Microstrip Antenna Technology", IEEE Transactions on Antennas and Propagation, vol. AP-29, No. 1, Jan. 1981, 23 pages.

Dewan, R. et al, "Improved Design of Tapering and Through Element Series Antenna", 2012 IEEE Symposium on Wireless Technology and Applications (ISWTA), Sep. 23-26, Bandung, Indonesia, pp. 202-205.

Edling, Thomas. Design of Circular Polarized Dual Band Patch Antenna, May 2012, Uppsala Universitet, 81 pages.

Hertlein, Robert et al., "Extended Range Guided Munition (ERGM) Safe & Arm Device and Height-of-burst Sensor", NDIA Fuze Conference, Apr. 9, 2003, 21 pages.

Ijaz, Bilal et al., "A Series-fed Microstrip Patch Array with Interconnecting CRLH Transmission Lines for WLAN Applications", 2013 7$^{th}$ European Conference on Antennas and Propagation (EuCAP), pp. 2023-2026.

Jamaluddin, M.H. et al., "Microstrip Dipole Antenna for WLAN Application", Wireless Communication Center, Faculty of Electrical Engineering, University Technology Malaysia, 205, pp. 30-32.

Jenn, Prof. David, "Radar Fundamentals", Naval Postgraduate School, http://www.nps.navy.mil/faculty/jenn, date unknown, 51 pages.

Jones, Bevan B. et al., "The Synthesis of Shaped Patterns with Series-Fed Microstrip Patch Arrays", IEEE Transactions on Antennas and Propagation, vol. AP-30, No. 6, Nov. 1982, pp. 1206-1212.

Kaur, Rajvir et al., "Tri-Widebank Inverted U-Slot Patch Antenna for Wireless Communication Applications", Indian Journal of Science and Technology, Vo. 10(16), Apr. 2017, 5 pages.

Keller, Steven D. et al., Quadirfilar Helix Antenna for Enhanced Air-to-Ground Communications, US Armey Research Laboratory, ARL-TR-79, May 2016, 34 pages.

Kraus, John D., "The Square-Corner Reflector Beam Antenna for Ultra High Frequencies", www.rfcafe.com/referencesqst/square-corner-reflector-beam-antenna-qst-november-1940.htm., Nov. 1940, 4 pages.

Lee, Kai Fong at al., "A Personal Overview of the Development of Patch Antennas", The University of Mississippi, Oct. 28, 2015, 78 pages.

Mehta, Surbhi et al., "An Overview: Various Slots Shapes of Micro-Strip Patch Antenna", International Conference on Multidisciplinary Research & Practice, IJRSI, vol. I, Issue VII, date unknown, pp. 175-178.

Mishra, Pushkar et al., "Modified Concentric Rings Based Square Shaped Fractal Antenna for Wi-Fi & WiMAX Application", International Journal of Electronics Engineering Research, ISSN 0975-6450, vol. 9, No. 7, 2017, pp. 1005-1012.

Niroo-Jazi, Mahmoud et al., "A New Triple-Band Circular Ring Patch Antenna with Monopole-like Radiation Pattern Using a Hybrid Technique", IEEE Transactions, vol. 59, No. 10, Oct. 2011, pp. 3512-3517.

Patil, Sharanu et al., "Design and Implementation of a Conformal Omnidirectional Microstrip Antenna Array on Cylindrical Surface", International Journal of Advances in Electronics and Computer Science, ISSN 2393-2835, vol. 2, Issue 8, Aug. 2015, 4 pages.

Perrin, Max, "Proximity Sensor Technologies Application to New Munitions", NDIA 58th Annual Fuze Conference, Jul. 7-9, 2015, 19 pages.

Product Information Sheet, "Selectable Effects Munition", L-3 Mustang Technology, 2011, 2 pages.

Shoukat Saad, et al., "Design of a Dual Band Frequency Reconfigurable Patch Antenna for GSM and Wi-Fi Applications", IEEE, 2016, 5 pages.

Slade, Bill, The Basics of Quadrifilar Helix Antenna, www.orbanmicrowavecom, 2015, pp. 1-20.

Stephenson, B.T. et al., "Endfire Slot Antennas", IRE Transactions—Antennas and Propagation, Apr. 1955, pp. 81-86.

Yang, Wanchen et al., "A Novel 24-GHz Series-fed Patch Antenna Array for Radar System", 2016 IEEE International Workshop on Electromagnetics: Applications and Student Innovation Competition (IWEM), May 16, 2016, 3 pages.

Yuan, Tao et al., "A Novel Series-Fed Taper Antenna Array Design", IEEE Antennas and Wireless Propagation Letters, vol. 7, 2008, pp. 362-365.

Zhang, Zongtang et al., "A Circularly Polarized Multimode Patch Antenna for the Generation of Multiple Orbital Angular Momentum

(56) References Cited

OTHER PUBLICATIONS

Modes", IEEE Antennas and Wireless Propagation Letters, vol. 16, 2017, pp. 521-524.

* cited by examiner

COMPACT ANTENNA SYSTEM FOR MUNITION

RELATED APPLICATIONS

The present application is a continuation of U.S. patent application Ser. No. 16/873,057, filed Jan. 23, 2020, issuing as U.S. Pat. No. 11,349,201 on May 31, 2022, which claims the benefit of U.S. Provisional Patent Application No. 62/918,296 filed Jan. 24, 2019, the disclosure of which is incorporated by reference herein in its entirety.

FIELD OF THE DISCLOSURE

The disclosure relates to generally to antenna systems for munitions, and more specifically, relates to antenna systems configured to be mounted in space-constrained nose sections of munitions, and utilizing munition structure to enhance antenna performance.

BACKGROUND OF THE DISCLOSURE

Munitions such as mortars, artillery, aerial bombs, and various guided weapons often rely on on-board antenna systems to communicate with base stations, detect intended targets, determine proximity to a target, and so on. As munitions have become more and more sophisticated, space for various components, including antennas, to be mounted on or in the munition, has become even more limited.

Many antennas are mounted on the sides of the main body of the munition as those regions may provide the most available space. However, it can be desirable to mount an antenna in a nose section of a munition so that the antenna radiates forward in a direction of travel. While it is known to mount antennas within a nose section of a munition, such a practice is not common as much of the space within the nose section of a munition, particularly a modern munition with a guidance system, is occupied by guidance-system components. For example, a so-called "smart bomb" may rely on a target-seeking system mounted in the nose section to seek out an intended target and guide the munition towards it.

In addition to the structural challenges of fitting and orienting an antenna in a space-constrained nose-section of a munition, munition structures adjacent to the antenna can adversely affect antenna performance.

SUMMARY OF THE DISCLOSURE

Embodiments of the present enclosure include compact antennas, antenna systems for munitions that may include parts of the munition itself, and related methods.

In one embodiment of a munition antenna system, the system includes one or more uniquely-shaped dipole antennas wrapped around parts of a munition guidance system. Portions of the dipole antenna may be located on top of a printed circuit board substrate, and portions on the bottom of the substrate, so as to fit the antenna into the limited space of a nose section of the munition. In an embodiment, the munition antenna system includes both a transmit antenna system and a receive antenna system. The compact design of each of the two antenna systems maximizes a distance between the two antennas so as to avoid unwanted coupling of the two antennas. Isolation barriers located between the ends of the antenna systems may be used to further diminish the possibility of coupling.

In an embodiment, the munition antenna system incorporates portions of the munition guidance system, such as a semi-active laser system, as a reflector to improve performance. A vertical convex outer surface of a metal cylinder of a SAL serves as one reflective surface, and a horizontal base surface serves as a second reflective surface, such that the reflector system resembles a corner reflector.

The use of compact designs to fit into a nose section of a munition, as well as the use of existing munition structure as a reflector provides an efficient, high-performing munition antenna system.

An embodiment of the disclosure includes a munition antenna system for mounting in a nose section of a munition, comprising: a ring-shaped substrate defining a central aperture and a central axis, an outside diameter and an inside diameter, the ring-shaped substrate including an outside edge, an inside edge, a top planar surface, and a bottom planar surface, the top planar surface substantially parallel to the bottom planar surface The munition antenna system also includes a first antenna system on a first portion of the substrate and a second antenna on a second portion of the substrate. The first antenna system includes: a first plurality of conductive segments positioned on the top planar surface of the substrate at a first radial distance from the inside edge of the substrate, one or more of the first plurality of conductive segments comprising curved conductive segments defining a first curvature; and a second plurality of conductive segments positioned on the bottom planar surface of the substrate at a second radial distance from the inside edge of the substrate, one or more of the second plurality of conductive segments comprising curved conductive segments defining a second curvature, the second plurality of conductive segments positioned axially below the first plurality of conductive segments, such that a portion of the first plurality of conductive segments overlies a portion of the second plurality of conductive segments.

The second antenna system includes: a third plurality of conductive segments positioned on the top planar surface of the substrate at the first radial distance from the inside edge of the substrate, one or more of the third plurality of conductive segments comprising curved conductive segments defining the first curvature; and a fourth plurality of conductive segments positioned on the bottom planar surface of the substrate at the second radial distance from the inside edge of the substrate, one or more of the fourth plurality of conductive segments comprising curved conductive segments defining the second curvature, the fourth plurality of conductive segments positioned axially below the third plurality of conductive segments, such that a portion of the third plurality of conductive segments overlies a portion of the fourth plurality of conductive segments.

Another embodiment includes a munition antenna system for mounting in a nose section of a munition, comprising: a metal cylindrical portion defining a central axis and a circumference, and including an axially-extending outside surface; a base portion including a radially-extending surface; an antenna substrate encircling the metal cylindrical portion and including a top surface and a bottom surface; a transmit antenna system comprising a first transmit arm on the top surface of the antenna substrate, and a second transmit arm on the bottom surface of the antenna substrate, the first transmit arm extending circumferentially in a clockwise direction about the central axis, the second transmit arm extending circumferentially in a counter-clockwise direction about the central axis; a receive antenna system comprising a first receive arm on the top surface of the antenna substrate and a second receive arm on the bottom surface of the antenna substrate, the first receive arm extending circumferentially in the clockwise direction about the central axis, the second receive arm extending circumferentially in the counter-clockwise direction about the central axis; and an isolation barrier located between the transmit antenna system and the receive antenna system.

During operation, the first and second transmit arms radiate energy that is reflected off of the axially-extending outside surface of the cylindrical portion and the radially-extending surface of the base portion.

Yet another embodiment includes a munition antenna system for mounting in a nose section of a munition that includes: a metal cylindrical portion of a SAL defining a central axis and including an outside surface; and a quadrifilar helix antenna inside the nose section and comprising four helical wire loops and a ground plane, each of the wire loops wrapped about the metal cylindrical portion of the SAL and defining a same pitch.

Another embodiment includes a method of operating a munition, comprising: determining a desired target for the munition; launching the munition; transmitting a radio-frequency transmission signal from a transmit antenna mounted in the nose section of the munition, the transmit antenna comprising a curvilinear dipole antenna wrapped about a housing of a semi-active laser system of the munition.

BRIEF DESCRIPTION OF THE DRAWINGS

The invention can be understood in consideration of the following detailed description of various embodiments of the invention in connection with the accompanying drawings, in which.

Figure 1:
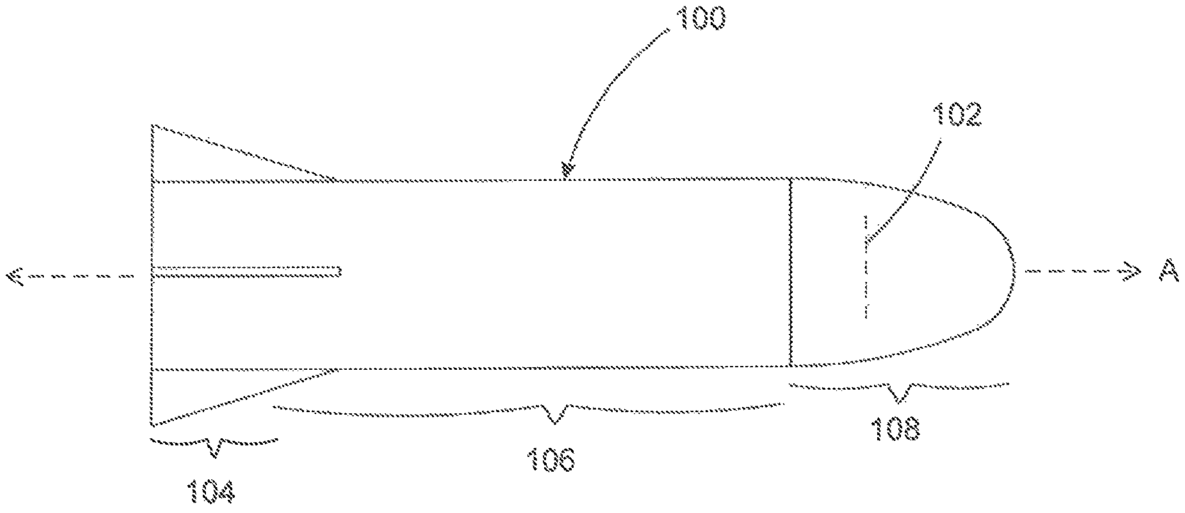
FIG. 1 is a depiction of a munition having a munition antenna system in a nose section of the munition, according to an embodiment of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIG. 1, a schematic diagram of a munition 100 with an embodiment of a munition antenna system 102 is depicted. Munition 100 includes tail section 104, main body section 106 and nose section 108. Central axis A extends longitudinally along a length of munition 100 from tail section 104 to nose section 108, and typically indicates a direction of travel when launched. In the embodiment depicted, munition antenna system 102 is configured to be mounted within nose section 108, as described further below.

Munition 100 may comprise any of a variety of known of munitions, including mortars, naval and field artillery, aerial bombs, bullets, various guided weapons, such as missiles and rockets, and other various types of projectiles configured to be projected or launched. In an embodiment, munition 100 comprises a guided munition.

Figure 2:
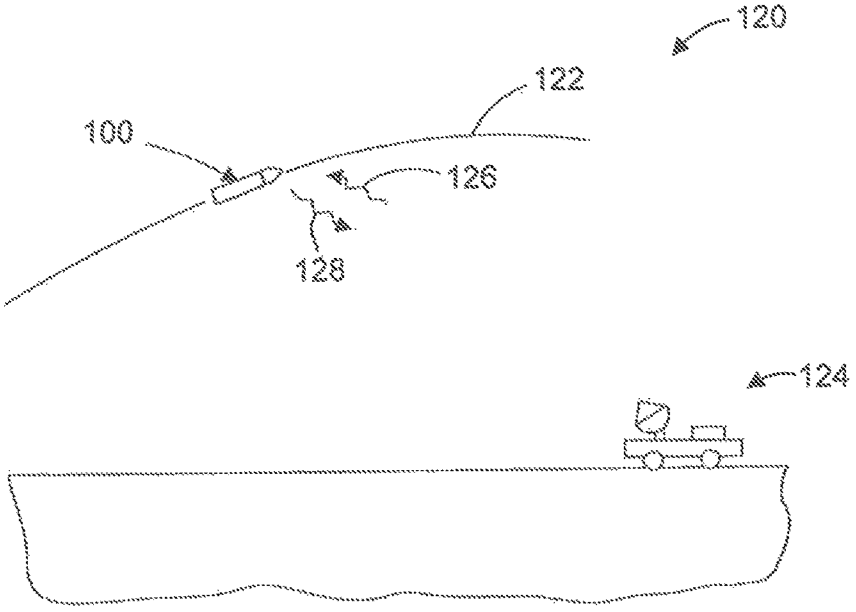
FIG. 2 is a schematic of a munitions communication system, according to an embodiment of the disclosure.

Referring also to FIG. 2, an embodiment of a munition communication system 120 is depicted. Munition 100 having munition antenna system 102, and on a flight path 122 is depicted. In an embodiment, communication base 124 communicates with munition 100, transmitting signals 126 to munition antenna system 102 on munition 100, and receiving signal 128 from munition antenna system 102 on munition 100. Communication base 124 may comprise a ground base as depicted, but alternatively may comprise an air base, or may comprise a satellite, or other terrestrial-based communication platforms.

In addition to, or rather than, being used for communication with an external station or device, munition antenna system 102 may be used for proximity sensing or for other functions. In such an embodiment, munition antenna system 102 transmits a signal 126 toward a target, then receives a reflected signal 128 to determine distance to a target. In an embodiment, munition antenna 102 may be used to sense proximity or distance to a target so as to determine when to detonate the munition, i.e., sensing and control of "height of burst." In one such embodiment, munition antenna 102 system may be part of a height-of-burst sensor and control system.

Applications of antennas for communication and proximity sensing are described in U.S. Pat. No. 7,849,797 to Geswneder et al., U.S. Pat. No. 8,552,349 to Alexander, U.S. Pat. No. 9,683,814 to Dryer, U.S. Pat. No. 9,709,372 to Edwards, and U.S. Pat. No. 7,548,202 to Jennings, all of which are incorporated herein by reference in their entireties. Methods and systems for controlling munition detonation, e.g., height of burst applications, are described in U.S. Pat. No. 7,098,841, entitled "Methods and Systems for Controlling a Height of Munition Detonation," which is incorporated herein by reference in its entirety.

Figure 3:
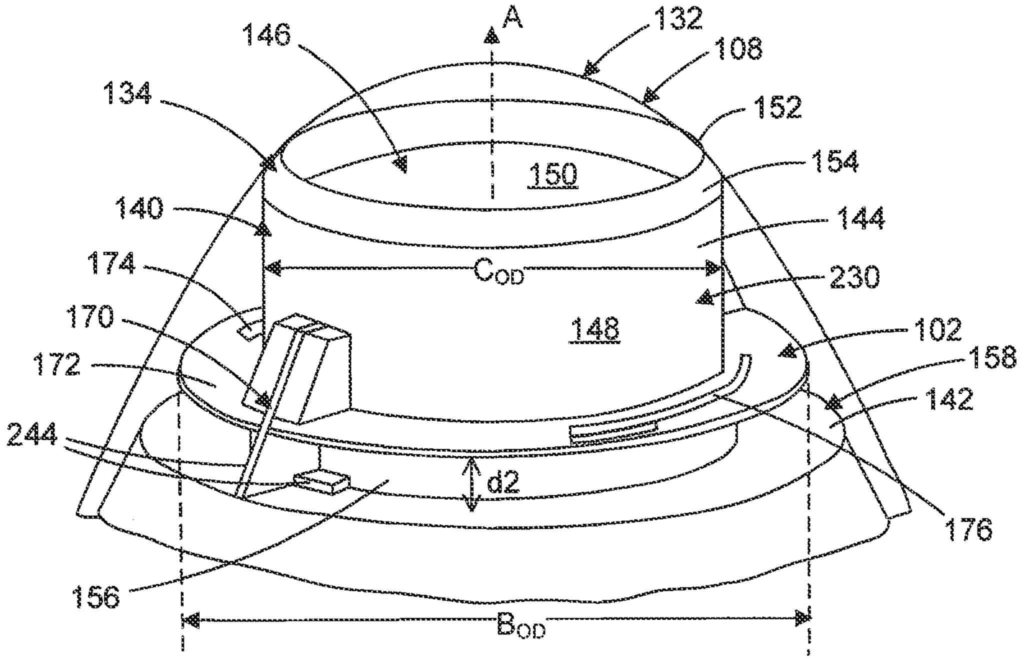
FIG. 3 is a perspective view of a munition antenna system surrounding a semi-active laser (SAL) in a nose section of a munition, according to an embodiment of the disclosure.

Referring to FIG. 3, an embodiment of a munition antenna system 102 mounted under radome 132 of nose section 108 is depicted. In this embodiment, munition 100 comprises a guided munition that includes guidance system 134. Guidance system 134 controls movement of munition 100, and may be part of a greater guidance, navigation and control system of munition 100. In an embodiment, guidance system 134 is a laser-guided system. In one such embodiment, and as depicted, guidance system 134 comprises a semi-active laser (SAL) "seeker," or seeker system. In an embodiment, the SAL seeker system "seeks" out a target by sensing laser light reflected from a target and adjusts course toward the source of reflected laser light. In an embodiment, an external device operated by a user or other external system is used to direct laser light to the target for sensing by the incoming SAL seeker.

Referring also to FIGS. 4-7, an embodiment of munition antenna system 102 is depicted. In the embodiment depicted, munition antenna system 102 comprises substrate 172, first antenna system portion 174, which in an embodiment is an antenna transmit portion or system 174, and second antenna system portion 176, which in an embodiment is an antenna receive portion or system 176. In the depicted embodiment, munition antenna system 102 includes two antenna systems 174 and 176, however, it will be understood that munition antenna system 102 may include only one antenna system, which may be an antenna receive system or an antenna transmit system, or an antenna system configured to either receive or transmit. In another embodiment, antenna system 102 may include more than two antenna systems, such as three antenna systems, or four antenna systems. As described further below, when multiple antenna systems are included, the various antenna systems may be isolated from one another, and each may be performing the same or different transmit or receive functions.

In the embodiment depicted in the figures, and as described further below, munition antenna system 102 comprises a pair of balun-fed, printed dipole antennas.

Figure 4:
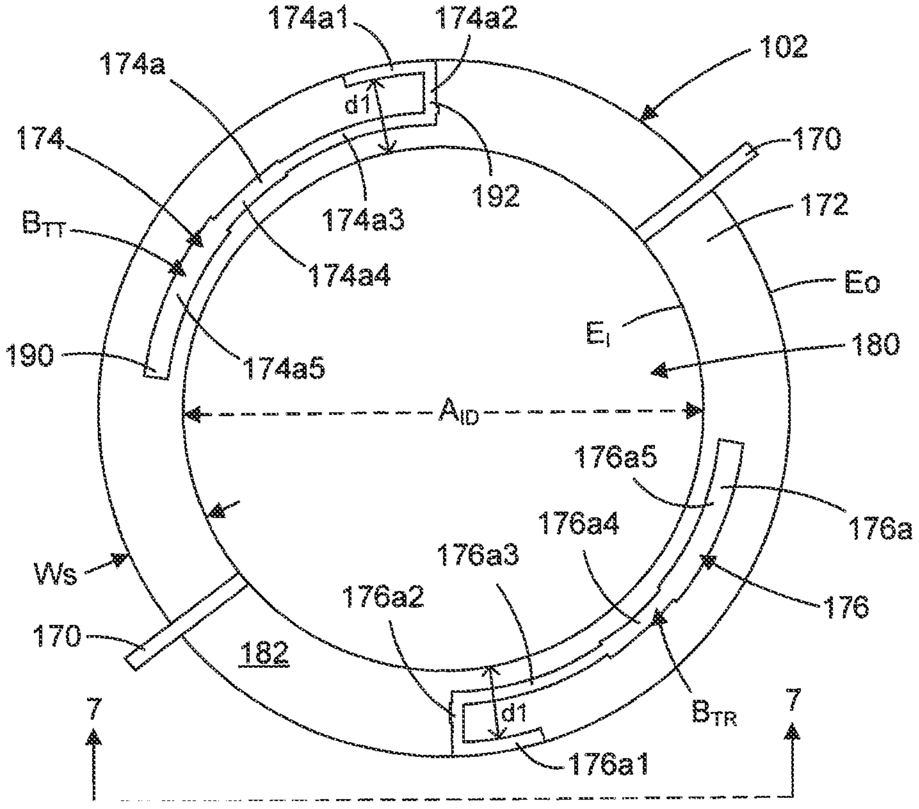
FIG. 4 is a top view of a munition antenna system, according to an embodiment of the disclosure.
Figure 5:
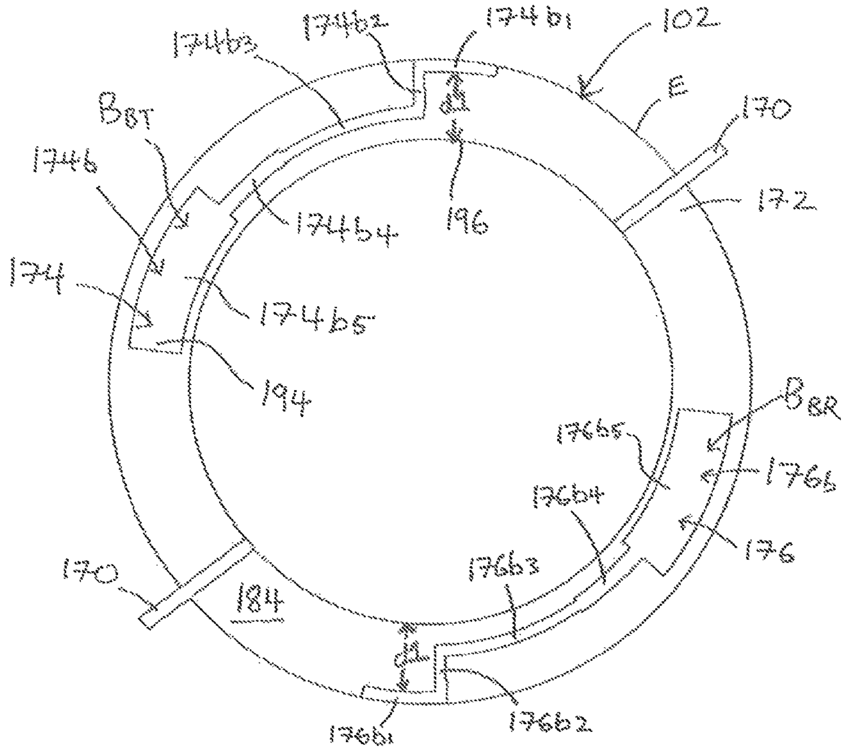
FIG. 5 is a bottom view of the munition antenna system of FIG. 4.
Figure 6:
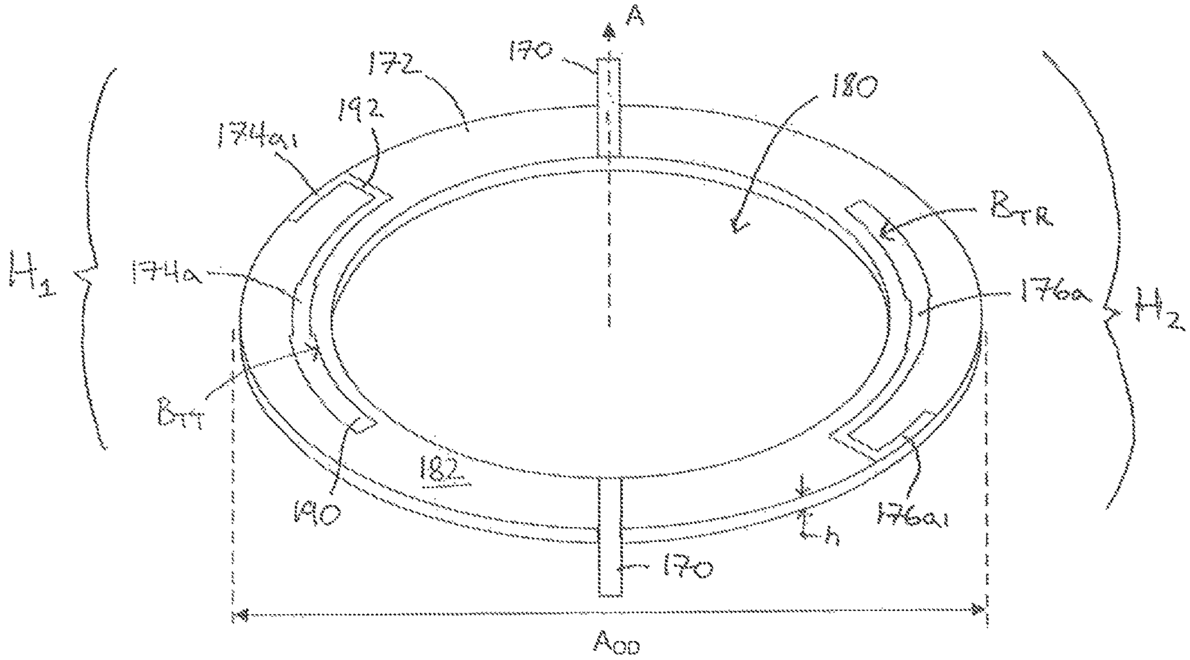
FIG. 6 is a top perspective view of the munition antenna system of FIG. 4, with the antenna rotated slightly in a counter-clockwise direction.
Figure 7:
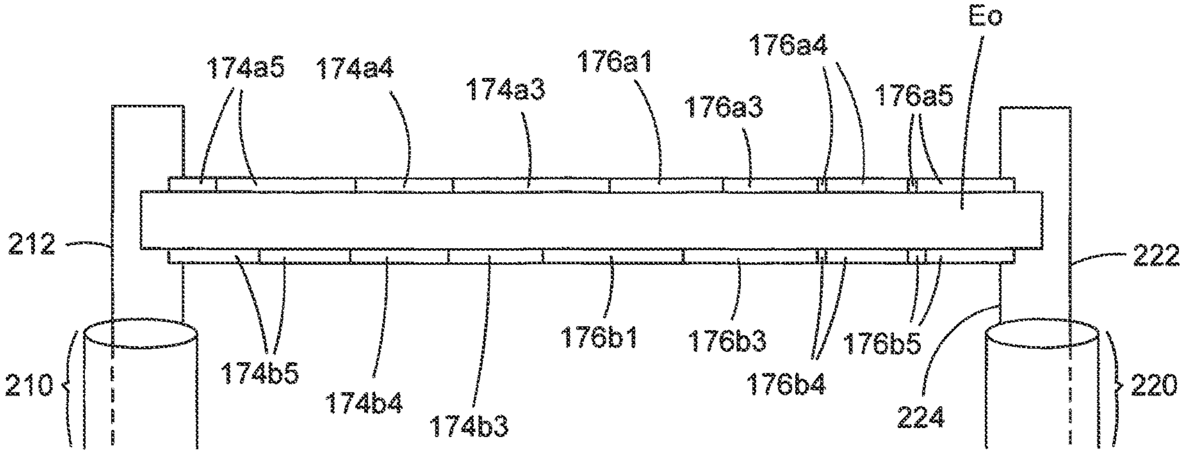
FIG. 7 is a side view of the munition antenna system of FIG. 4, with coaxial feedlines, according to an embodiment.

FIG. 4 is a top view of munition antenna system 102, and depicts first or top portions 174*a* and 176*a* of antenna transmit and receive systems 174 and 176, respectively; FIG. 5 is a bottom view of munition antenna system 102, and depicts second or bottom portions 174*b* and 176*b* of antenna transmit and receive systems 174 and 176, respectively; FIG. 6 is a top perspective view of munition antenna system 102, rotated somewhat about axis A, as compared to FIG. 4; and FIG. 7 is a front view of munition antenna system 102, with thicknesses of antenna transmit system 174 and antenna receive systems 176 exaggerated to better depict the antenna system structure.

Figure 8:
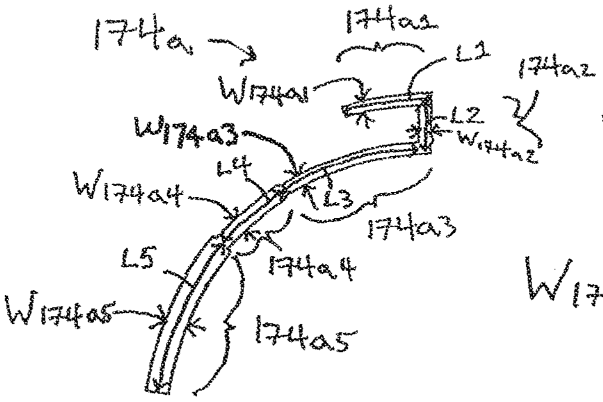
FIG. 8 is a view of a transmit antenna top portion of the antenna system depicted in FIG. 4.
Figure 9:
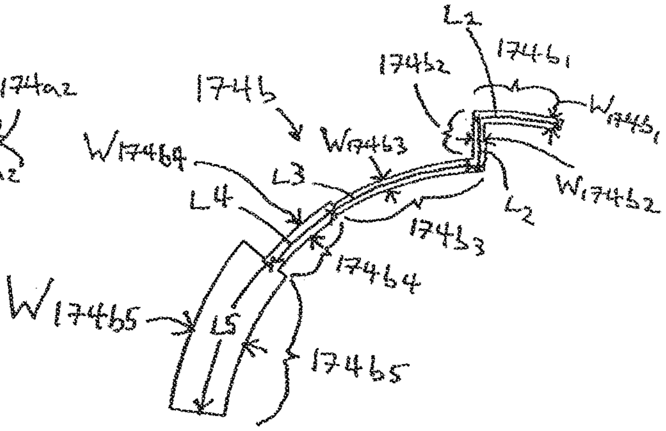
FIG. 9 is a view of a transmit antenna bottom portion of the antenna system depicted in FIG. 4.
Figure 11:
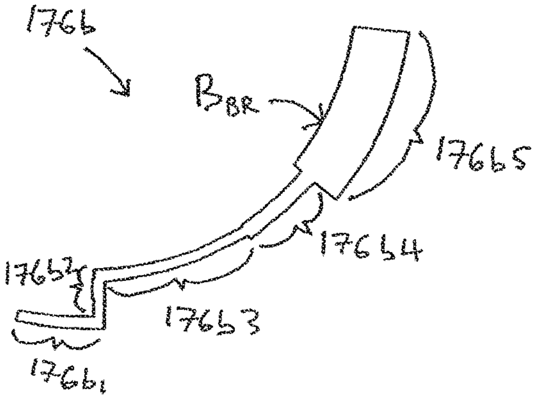
FIG. 11 is a view of a receive antenna bottom portion of the antenna system depicted in FIG. 5.
Figure 10:
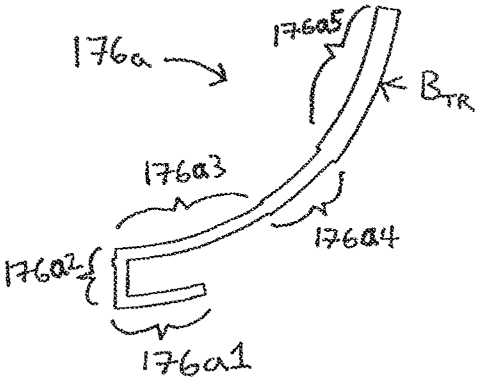
FIG. 10 is a view of a receive antenna top portion of the antenna system depicted in FIG. 5.

FIGS. 8-9 depict top portion 174*a* and bottom portion 174*b* of antenna transmit system 174, respectively; FIGS. 10-11 depict top portion 176*a* and bottom portion 174*b* of antenna receive system 176, respectively.

Referring again to FIGS. 3-7, in an embodiment, munition antenna system 102 comprises a microstrip antenna system. In such an embodiment, substrate 172 comprises substantially-rigid substrate, such as that used in a printed-circuit board (PCB), with antenna transmit system 174 and antenna receive system 176 supported by, adhered to, and/or constructed on substrate 172, as is typically accomplished with known microstrip antenna production techniques. In another embodiment, substrate 172 may comprise a flexible substrate allowing munition antenna system 102 to bend or flex to conform to the shape of a surface onto which munition antenna system 102 is mounted. In an embodiment, a rigid substrate 172 is manufactured to provide a curved portion having a curvature substantially matching a curvature of a surface of cylindrical portion 144 (see also, FIG. 3). Substrate 172 includes inner edge $E_I$ and outer edge $E_O$. For the purposes of this description, the term "edge" is used to describe what is actually an inside surface or an outside surface, respectively, of substrate 172. Since such inside and outside surfaces, in an embodiment, comprise a relatively small height h defined by a thickness of substrate 172, the terms "inside edge" and "outside edge" are used, though the terms "inside surface" and "outside surface" could be used interchangeably.

In an embodiment, substrate 172 comprises a dielectric having a dielectric constant Er, that may be constructed as a single layer, or with multiple layers. A dielectric material may include alumina, a fluorine-series resin, such as FR-4, a PPO or PPE resin, or modified epoxy resin, depending on desired dielectric characteristics, rigidity (flexibility), mechanical strength, heat resistance, and so on.

In an embodiment, and as depicted, munition antenna system 102, and its substrate 172, form a circular ring shape, defining aperture 180, inner diameter $A_D$, and outer diameter $A_{OD}$. Substrate 172 includes width Ws, a thickness or height h, first surface 182 and second surface 184. First surface 182 may be a "top" surface, and may be planar; second surface 184 may be a "bottom" surface, and may also be planar. Substrate 172 also includes first substrate half H1, on which antenna transmit system 174 is positioned, and second substrate half H2, on which antenna receive system 176 is positioned. Isolation barriers 170 define the theoretical separation of first substrate half H1 from second substrate half H2.

Antenna transmit system 174 and antenna receive system 176, in an embodiment, comprise one or more conductive materials, such as a copper or a copper alloy, which may be in the form of a relatively thin copper foil. In an embodiment, systems 174 and 176 comprise 1-ounce copper; in another embodiment, systems 174 and 176 comprise ½-ounce copper.

Microstrip antenna design, construction, materials, and so on are described in further detail in the article "Microstrip Antenna Technology", K. Carver, et al, IEEE Transactions on Antennas and Propagation, Vol. 29, Issue 1, January 1981, which is herein incorporated by reference in its entirety.

In an embodiment, and as depicted, munition antenna system 102 comprises a pair of half-wave dipole antennas fed by a pair of baluns, which together form antenna transmit system 174 and antenna receive system 176. Antenna transmit system 174 and antenna receive system 176 are located on separate and distinct portions of substrate 172, and as described further below, are separated by isolation barriers 170 so as to minimize coupling of the two antenna systems.

In an embodiment, antenna transmit system 174 is positioned radially opposite antenna receive system 176, or 180° from one another, to maximize a distance between the two antenna systems. Such a configuration that keeps the radiating dipole antenna arms opposite one another, optimizes co-polarization of the two antenna systems, and also, in combination with isolation barriers 170, helps prevent unwanted coupling of the two antenna systems. However, in other embodiments, antenna systems 174 and 176 may be positioned differently on substrate 172, with respect to one another, for various reasons, such as to accommodate other electronics on substrate 172, or to accommodate other system components.

Referring specifically to FIGS. 4 and 5, in an embodiment, and as depicted, antenna transmit system 174 includes a first or top transmit portion **174*a* located or positioned on first or top surface 182 of substrate 172, and a second or transmit bottom portion 174*b* located or positioned on second or bottom surface 184 of substrate 172. In this embodiment, top portion 174*a*, on top side 182 of substrate 172, is substantially positioned above or over bottom portion 174*b*, which is on bottom side 184 of substrate 172. In other words, top portion 174*a* is substantially overlying bottom portion 174*b* in an axial direction, spaced apart by substrate 172. As such, top portion 174*a* extends in a top plane defined by top surface 182, and bottom portion 174*b* extends in a bottom plane defined by bottom surface 184, the top plane being parallel to the bottom plane. Locating top portion 174*a* on top surface 182 over or above bottom portion 174*b* on bottom surface 184, as compared to placing both top and bottom portion on a same surface of substrate 172, such as on top surface 182, results in a more compact antenna design. Having a more compact antenna also achieves the result that all portions of antenna transmit system 174 can be spaced further away from antenna receive system 176 on substrate 172, eliminating or reducing coupling of system 174 from system 176**.

In an alternate embodiment, "top" (first) transmit portion **174*a* may be located on bottom surface 184, and "bottom" (second") transmit portion 174*b* may be located on top surface 182**.

In an embodiment, and as depicted, antenna receive system 176 includes a first or top receive portion **176*a* located or positioned on first or top surface 182 of substrate 172, and a second or receive bottom portion 176*b* located or positioned on second or bottom surface 184 of substrate 172. In this embodiment, top receive portion 176*a*, on top side 182 of substrate 172, is substantially positioned above or over bottom portion 176*b*, which is on bottom side 184 of substrate 172, in the same manner as described above for transmit portions 174*a* and 174*b***.

In an alternate embodiment, "top" (first) receive portion **176*a* may be located on bottom surface 184, and "bottom" (second") receive portion 176*b* may be located on top surface 182**.

Referring to FIGS. 4, 5, 8 and 9, top transmit antenna portion **174*a* and bottom transmit antenna portion 174*b*, which together comprise an embodiment of antenna transmit system 174** are depicted.

Referring specifically to FIGS. 4 and 8, an embodiment of top transmit antenna portion **174*a* is depicted. Top transmit antenna portion 174*a* as depicted includes a plurality of connected segments, including first top transmit segment 174*a*1, second top transmit segment 174*a*2, third top transmit segment 174*a*3, fourth top transmit segment 174*a*4 and fifth top transmit segment 174*a*5. Top transmit antenna portion 174*a* may include more or fewer conductive segments, depending on a number of desired design factors, such as desired antenna dimensions, substrate 172 size, transmission frequencies $f_0$, system impedance, and other such design factors. Further, although described as individual segments, it will be understood that in an embodiment, the multiple segments 174*a*1 to 174*a*5** may be manufactured as a typical micro-strip antenna, such that the segments are integrally formed to comprise a single, continuous, generally planar, conductive structure.

In an embodiment, segment **174*a*1 is a first transmit radiating antenna arm of top transmit antenna portion 174*a*, and segments 174*a*2 to 174*a*5 together form a first or top balun portion of top transmit antenna portion 174*a*, also referred to as top transmit balun portion $B_{TT}$. As described further below, bottom transmit antenna portion 174*b* includes a second radiating arm, such that antenna transmit system 174** comprises a dipole antenna, which may be a half-wave dipole antenna.

In an embodiment segment **174*a*1 (first or top transmit radiating antenna arm), also referred to herein as top transmit arm 174*a*1, comprises a curvilinear conductive segment extending circumferentially on substrate 172, bounded by a pair of curved, circumferentially-extending edges and a pair of linear, radially extending edges at each end. In an embodiment a curvature of top transmit arm 174*a*1 is approximately the same as a curvature defined by outer and inner edges $E_O$ and $E_I$ of ring-shaped substrate 172. In an embodiment, top transmit arm 174*a*1 extends circumferentially between edges $E_O$ and $E_I$, adjacent or near edge $E_O$, with limited, or no space, between top transmit arm 174*a*1 and edge $E_O$. Top transmit arm 174*a*1 extends in a counterclockwise direction from segment 174*a*2 toward segment 174*a*5**.

In other embodiments not depicted, top transmit arm **174*a*1 may define a linear shape that may be defined by four straight edges, i.e., define a rectangle. In such an embodiment, top transmit arm 174*a*1 may still extend generally circumferentially on top surface 182**, though not entirely, due to the linear nature of the segment.

Top transmit arm **174*a*1 defines length $L_1$ and width $W_{174a1}$. In an embodiment in which top transmit arm 174*a*1 defines a curvilinear shape, as depicted, length $L_1$ defines an arc-length. Length $L_1$ and width $W_{174a1}$ are determined based on desired radiating frequencies of antenna system transmit portion 174*a*. It should be noted that the dipole arms 174*a*1, 176*a*1, 174*b*1, 176*b*1** can also consist of other shapes such as trapezoidal shapes, triangular shapes and so on for frequency Band-width control mechanisms.

In an embodiment, top transmit arm **174*a*1 is located a radial distance d1 from outside surface 148 of cylindrical portion 144. Generally, distance d1 is determined based on the predetermined operating (transmission or receiving) frequency $f_0$ of munition antenna system 102**. In one such embodiment, distance d1 is equal to, or approximately equal to, one-quarter of a wavelength of frequency $f_0$ ($\lambda/4$).

Distance d1 may defined more specifically as a radial distance from outside surface 148 to a width-wise center portion of top transmit arm **174*a*1. In an alternate embodiment, distance d1 may be defined as a radial distance from outside surface 148 to a radially-closest edge of top transmit arm 174*a*1, which is the distance from surface 148 to a center of top transmit arm 174*a*1, less half of the width $W_{175a1}$ of top transmit arm 174*a*1**.

In an embodiment, because top transmit arm **174*a*1 wraps about cylindrical surface 148 with a curvature substantially the same as a curvature of surface 148, all points along a center line and also inner and outer edge lines of top transmit arm 174*a*1 are at a distance d1 from cylindrical portion 144**.

Distances from other transmit and receive arms of munition antenna system 102 may also be determined in the same fashion, such that, in an embodiment, all dipole antenna arms are located a distance $\lambda/4$ from surface 148.

Top transmit balun portion $B_{TT}$, as described above, includes conductive segments 174$a$2 to 174$a$5, defining lengths $L_2$ to $L_5$, and widths $W_{174a2}$ to $W_{174a5}$, respectively. Top transmit balun portion $B_{TT}$ defines first or distal end 190 which is distal to top transmit arm 174$a$1 and second or proximal end 192, which is proximate to top transmit arm 174$a$1.

In an embodiment, segments 174$a$3, 174$a$4 and 174$a$5 each define a curvilinear shape and are aligned along a common arc, such that the three segments share a common curvature, which in an embodiment is a same curvature of edges $E_I$ and $E_O$ of substrate 172. In such an embodiment, the portion of balun portion $B_{TT}$ defined by segments 174$a$3, 174$a$4 and 174$a$5 extends circumferentially along top surface 182 between edges $E_I$ and $E_O$. In other words, balun portion $B_{TT}$, and in particular, segments 174$a$3, 174$a$4 and 174$a$5, wrap around cylindrical portion 144. In other embodiments, segments 174$a$3, 174$a$4 and 174$a$5 may define linear shapes, e.g., rectangles without curves.

In an embodiment, widths W of segments 174$a$2 to 174$a$5 are different from one another, such that top balun portion $B_{TT}$ comprises a tapered balun portion. More specifically, in the embodiment depicted width W174$a$5 is wider than width W174$a$4, which is wider than width W174$a$3. Width W174$a$2, in an embodiment, is approximately a same width as width W174$a$3, which may be approximately the same as width W174$a$1 of top transmit arm 174$a$1. In other words, in an embodiment, a width of top transmit balun portion $B_{TT}$ is widest at distal end 190 and narrowest at proximal end 192. As such, a width of top transmit balun portion $B_{TT}$ progressively decreases in a direction from distal end 190 to proximal end 192 and top transmit arm 174$a$1. Although depicted as decreasing in a discrete or stepwise manner, i.e., transitioning from one distinct segment width to the next, it will be understood that a width of top transmit balun portion $B_{TT}$ may decrease linearly, or smoothly, over its length (the sum of L5 to L2), gradually decreasing in width.

More generally, dimensions of balun portion BTT, (and other balun portions $B_{BT}$, $B_{BR}$, and $B_{TR}$) such as various widths and lengths of the portions of balun portion $B_{TT}$ discussed above, are determined so as to create an impedance match for feeding the balanced dipole operating at a particular design frequency.

In an embodiment, balun portion $B_{TT}$ extends less than one-quarter of a circumference of ring-shaped substrate 172, the circumference being defined by either of edge $E_I$ or $E_O$. In another embodiment, balun portion $B_{TT}$ extends approximately one-quarter of a circumference of ring-shaped substrate 172. In other embodiments, balun portion $B_{TT}$ extends more than one-quarter of a circumference of ring-shaped substrate 172, but less than one-half of a circumference of substrate 172. As designs of balun portion $B_{TT}$ having longer length extend further about the circumference of substrate 172, and about cylindrical portion 144, antenna transmit system 174 becomes closer to antenna receive system 176, increasing the chances of unwanted coupling. The extent that balun portion $B_{TT}$ extends circumferentially about cylindrical portion 144 will be based on a combination of overall balun length and a diameter of cylindrical portion 144. Overall balun length is determined primarily by impedance matching needs and operating frequency, and a diameter of cylindrical portion 144 may vary from SAL to SAL. When possible, and within operating design characteristics, balun lengths may be selectively varied to ensure a compact design.

Referring also to FIG. 7, in an embodiment, top balun portion $B_{TT}$ is connected to an antenna feedline, feedline 210, which in an embodiment, and as depicted schematically, is a coaxial-cable feedline having a first conductor 212, which may be a signal conductor, and a second conductor 214, which may be a ground conductor. As depicted, segment 174$a$5 is in electrical connection with first conductor 212 of feedline 210, and segment 174$b$5 is in electrical connection with second conductor 214 of feedline 210.

In an embodiment, segment 174$a$5 is sized so as to match an expected impedance of antenna feedline 210, including first conductor 212 so as to balance the feedline with the antenna load. In an embodiment, segment 174$a$5 is sized to have an impedance of 50 ohms, though segment 174$a$5 may be sized to have other impedances above or below 50 ohms, such as 75 ohms, or other impedances.

In an embodiment, segment 174$a$3 is also sized to balance the load. In an embodiment, the dipole antenna has a 73 ohm impedance, and balun $B_{TT}$, is sized to balance a 50 ohm coaxial load with a 73 ohm dipole antenna.

Length and width of segment 174$a$, which functions as a quarter-wavelength transformer, will generally be determined by the operating frequency of the antenna. In an embodiment, segment 174$a$ is sized to have an impedance of 60 ohms.

As will be understood by those of ordinary skill in the art, a dipole must be fed in an balanced manner, where a coaxial feed is unbalanced. In an embodiment, the receive and transmit antennas are designed to match an industry standard 50 ohm coaxial cable to a 73 ohm dipole. Balun $B_{TT}$ (and other balun portions $B_{BT}$, $B_{BR}$, and $B_{TR}$) creates an unbalanced to balanced transformation from our coaxial connection to our dipole, at the same time the quarter wave transformer is implemented to create our 50 ohm to 73 ohm transformation. Thusly, 174$a$5 is determined as a microstrip 50 ohm impedance, 174$a$3 is determined as the 73 ohm impedance to match the dipole. Then 174$a$4 length is determined as a quarter wavelength of the structure (not free space) in which the impedance is taken as approximately 60 ohms. As such, and in an embodiment, segment 174$b$5 width>>174$a$5 width but 174$b$5 length=174$a$5, where >> indicates at least twice as wide, In an embodiment, the remaining segments have the same widths and lengths (174$a$4=174$b$4, 174$a$3=174$b$3, 174$a$2=174$b$2).

Further, it will be understood that the depicted connection of feedline 210 to antenna system transmit portion 174 is schematic only, and that an actual connection, in an embodiment, might entail conductor 212 extending through substrate 172, and possibly through bottom transmit antenna portion 174$b$ to be connected to a bottom or other portion of segment 174$a$5.

Referring to FIGS. 5 and 9, an embodiment of bottom transmit antenna portion 174$b$ is depicted. In an embodiment, bottom transmit antenna portion 174$b$ is very similar to top transmit portion 174$a$, with some differences including that bottom transmit portion 174$b$ is on bottom surface 184, rather than top surface 182, that bottom transmit arm 174$b$1 extends in a clockwise direction, rather than counterclockwise direction, and that a bottom transmit balun portion $B_{BT}$ defines a larger overall conductive area, all as described further below.

Bottom transmit antenna portion 174$b$ as depicted includes a plurality of connected segments, including first bottom transmit segment 174$b$1, second bottom transmit segment 174$b$2, third bottom transmit segment 174$b$3, fourth bottom transmit segment 174$b$4 and fifth bottom transmit segment 174$b$5. Bottom transmit antenna portion 174$b$ may include more or fewer conductive segments, depending on a number of desired design factors, such as desired antenna dimensions, substrate 172 size, transmission frequencies $f_0$, system impedance, and others. Transmitting and receiving frequencies, in an embodiment are at least 500 MHz; in some embodiments, the frequencies may be above 500 MHz and up to 100 GHz; in other embodiments, the frequency may be above 100 GHz, such as up to several hundred GHz and beyond. Further, although described as individual segments, it will be understood that in an embodiment, the multiple segments **174*b*1 to 174*b*5** may be manufactured as a typical micro-strip antenna, such that the segments are integrally formed to comprise a single, continuous conductive structure.

In an embodiment, segment **174*b*1 is a second transmit radiating antenna arm of bottom transmit antenna portion 174*b*1, and segments 174*b*2 to 174*b*5 together form a second or bottom balun portion of bottom transmit antenna portion 174*a*, also referred to as bottom transmit balun portion $B_{BT}$. Second transmit radiating antenna arm of bottom transmit antenna portion 174*b* forms the second arm of a dipole antenna of antenna transmit system 174. Bottom transmit balun portion $B_{BT}$, together with top balun portion $B_{TT}$ form a transmit balun $B_T$ for antenna transmit system 174**.

In an embodiment, segment **174*b*1 (second or bottom transmit radiating antenna arm), also referred to herein as bottom transmit arm 174*b*1, comprises a curvilinear conductive segment extending circumferentially on bottom surface 184 of substrate 172, bounded by a pair of curved, circumferentially-extending edges and a pair of linear, radially extending edges at each end. In an embodiment a curvature of bottom transmit arm 174*b*1 is approximately the same as a curvature defined by an outer and inner edges $E_O$ and $E_I$ of ring-shaped substrate 172. In an embodiment, bottom transmit arm 174*b*1 extends circumferentially between edges $E_O$ and $E_I$, adjacent or near edge $E_O$, with limited, or no space, between top transmit arm 174*b*1** and edge $E_O$.

In other embodiments not depicted, bottom transmit arm **174*b*1 may define a linear shape that may be defined by four straight edges, e.g., a rectangle. In such an embodiment, bottom transmit arm 174*b*1 may still extend generally circumferentially on bottom surface 184**, though not entirely circumferentially, due to the linear nature of the segment.

Bottom transmit arm **174*b*1 defines length $L_1$ and width $W_{174b1}$. In an embodiment in which bottom transmit arm 174*b*1 defines a curvilinear shape, as depicted, length $L_1$ is an arc-length. Length $L_1$ and width $W_{174b1}$ are determined based on desired radiating frequencies and bandwidth of antenna system transmit portion 174*b***.

In an embodiment, bottom transmit arm **174*b*1 may be the same, or substantially the same, size and area as top transmit arm 174*a*1, sharing a same length $L_1$ and width, though bottom transmit arm 174*b*1 extends circumferentially in an opposite direction as compared to top transmit arm 174*a*1**, i.e., extends clockwise rather than counter-clockwise, according to the orientation of the figures.

In an embodiment, bottom transmit arm **174*b*1 is located a distance d1 from outside surface 148 of cylindrical portion 144, which may be λ/4 as described above with respect to top transmit arm 174*a*1**.

Bottom transmit balun portion $B_{BT}$, as described above, includes conductive segments **174*b*2 to 174*b*5, defining lengths $L_2$ to $L_5$, and widths $W_{174b2}$ to $W_{174b5}$, respectively. Bottom transmit balun portion $B_{BT}$ defines first or distal end 194 which is distal to top transmit arm 174*b*1 and second or proximal end 196, which is proximal to top transmit arm 174*b*1**.

In an embodiment, segments **174*b*3, 174*b*4 and 174*b*5 each define a curvilinear shape and are aligned along a common arc, such that the three segments share a common curvature, which in an embodiment is a same curvature of edges $E_I$ and $E_O$ of substrate 172. In such an embodiment, the portion of balun portion $B_{BT}$ defined by segments 174*b*3, 174*b*4 and 174*b*5 extends circumferentially along top surface 182 between edges $E_I$ and $E_O$. In other embodiments, segments 174*a*3, 174*a*4 and 174*a*5** may define linear shapes.

In an embodiment, widths W of segments **174*b*2 to 174*b*5 are different from one another. More specifically, in the embodiment depicted, width $W_{174b5}$ is wider than width $W_{174b4}$, which is wider than width $W_{174b3}$. Width $W_{174b2}$ is approximately a same width as width $W_{174b3}$, which may be approximately the same as width $W_{174b1}$ of bottom transmit arm 174*b*1. In other words, in an embodiment, a width of bottom transmit balun portion $B_{BT}$ is widest at distal end 194 and narrowest at proximal end 196**.

As such, a width of bottom transmit balun portion $B_{BT}$ progressively decreases in a direction from distal end 194 to proximal end 196 and bottom transmit arm **174*b*1. Although depicted as decreasing in a discrete or stepwise manner, i.e., transitioning from one distinct segment width to the next, it will be understood that a width of bottom transmit balun portion $B_{BT}$ may decrease linearly, or smoothly and gradually, over its length (the sum of L5 to L2**), gradually decreasing in width.

In an embodiment, bottom transmit balun portion $B_{BT}$ extends less than one-quarter of a circumference of ring-shaped substrate 172. In another embodiment, balun portion $B_{BT}$ extends approximately one-quarter of a circumference of ring-shaped substrate 172. In other embodiments, balun portion $B_{BT}$ extends more than one-quarter of a circumference of ring-shaped substrate 172, but less than one-half of a circumference of substrate 172. As designs of balun portion $B_{BT}$ having longer length extend further about the circumference of substrate 172, portions of the feed to antenna transmit system 174 becomes closer to antenna receive system 176, increasing the chances of unwanted coupling.

In an embodiment, and as depicted, the width of bottom segment **174*b*5 is not the same as the width of corresponding top segment 174*a*5 located above segment 174*b*5. In an embodiment, and as depicted, segment 174*b*5 may be wider than segment 174*a*5. Referring specifically to FIG. 7, in one such embodiment, segment 174*b*5 serves as a ground plane and a point of connection to second/ground conductor 214 of feed line 212. In one such embodiment, a width of segment 174*b*5 is determined based at least in part on ease of connection to ground conductor 214. In an embodiment, ground conductor 214 comprises a multi-strand conductor mesh or shield of a coaxial cable, the shield defining a diameter that is approximately the same width as segment 174*b*5**, or slightly smaller than width $W_{174b5}$, for ease of mechanical connection.

Referring to FIGS. 4, 5, 10 and 11, top receive antenna portion **176*a* and bottom transmit antenna portion 176*b*, which together comprise an embodiment of antenna receive system 176, are depicted. In an embodiment, and as depicted, antenna receive system 176 is substantially the same as antenna transmit system 174. Consequently, the above description regarding antenna transmit system 174 and its components applies to antenna receive system 176. Nonetheless, a partial description of antenna receive system 176** is described below with respect to the figures.

Referring specifically to FIG. 10, an embodiment of top receive antenna portion **176*a*, which is substantially the same as top transmit antenna portion 174***a*, is depicted. In an embodiment, top receive antenna portion 176*a* includes connected conductive segments 176*a*1, 176*a*2, 176*a*3, 176*a*4 and 176*a*5. Segment 176*a*1 forms a first or top dipole antenna transmit arm 176*b*1, while segments 176*a*2, 176*a*3, 176*a*4 and 176*a*5, in combination, form top receive balun portion BTR.

Referring specifically to FIG. 11, an embodiment of bottom receive antenna portion 176*b*, which is substantially the same as bottom transmit antenna portion 174*b*, is depicted. In an embodiment, bottom receive antenna portion 176*b* includes connected conductive segments 176*b*1, 176*b*2, 176*b*3, 176*b*4 and 176*b*5. Segment 176*b*1 forms a second or bottom dipole antenna receive arm 176*b*1, while segments 176*b*2, 176*b*3, 176*b*4 and 176*b*5, in combination, form bottom receive balun portion $B_{BR}$.

Top receive balun portion $B_{TR}$ and bottom receive balun portion $B_{BR}$ in combination form antenna receive balun $B_R$ for antenna system receive portion 176.

Referring also to FIG. 7, in an embodiment, top balun portion $B_{TR}$ is connected to an antenna feed line, feed line 220, which in an embodiment, and as depicted schematically, is a coaxial-cable feed line having a first conductor 222, which may be a signal conductor, and a second conductor 224, which may be a ground conductor. As depicted, segment 176*a*5 is in electrical connection with first conductor 222 of feed line 220, and segment 176*b*5 is in electrical connection with second conductor 224 of feed line 220.

In an embodiment, segment 176*a*5 is sized so as to match an expected impedance of antenna feed line 220, including first conductor 222 so as to balance the feed line with the antenna load. In an embodiment, segment 176*a*5 is sized to have an impedance of 50 ohms, though segment 176*a*5 may be sized to have other impedances above or below 50 ohms, such as 75 ohms, or other impedances.

Further, it will be understood that the depicted connection of feed line 220 to antenna system receive portion 176 is schematic only, and that an actual connection, in an embodiment, might entail conductor 222 extending through substrate 172, and possibly through bottom receive antenna portion 176*b* to be connected to a bottom or other portion of segment 176*a*5.

Referring specifically to FIG. 3, an embodiment of munition antenna system 102 mounted to cooperate with guidance system 134 is depicted and further described below.

In an embodiment, guidance system 134 includes housing 140 that includes base portion 142 and cylindrical portion 144. Base portion 142 and cylindrical portion 144 may comprise an integral housing, or may comprise separate parts combined to form housing 144. In an embodiment, base portion 142 and cylindrical portion 144 comprise a metallic material.

Cylindrical portion 144 extends from base portion 142 axially and defines cavity 146 and outside diameter $C_{OD}$. Cylindrical portion 144 includes outer surface 148, inner surface 150, and circumferential edge 152. In an embodiment, circumferential edge 152 may be beveled or chamfered, as depicted. Cylindrical portion 144 also includes top portion 154 and bottom portion 156. Top portion 154 includes circumferential edge 152. Bottom portion 156 is adjacent base portion 142.

In an embodiment, base portion 142 comprises a circular ring shape, which may be generally flat, defining top surface 158. In an embodiment, top surface 158 is a planar surface. Base portion 142 may define an outside diameter that is greater than outside diameter $C_{OD}$ of cylindrical portion 144. Base portion 142 and its top surface 158 extend radially from bottom portion 156 of cylindrical portion 144.

In an embodiment, munition antenna system 102 cooperates with portions of guidance system 134 such that portions of guidance system 134 form a part of munition antenna system 102. In an embodiment, munition antenna system 102, in addition to the components and portions described above, also include base portion 142 and cylindrical portion 144 of munition 100 or guidance system 134. Base portion 142 and cylindrical portion 144 may also comprise portions of a SAL. In an embodiment, base portion 142 and cylindrical portion 144 comprise antenna reflector system 230.

In such an embodiment, munition antenna system 102 comprises substrate 172, antenna transmit portion 174, antenna receive portion 176, a plurality of isolation barriers 170, and antenna reflector system 230.

As will be described further below, base portion 142 and cylindrical portion 144 form a unique corner reflector that cooperates with munition antenna system 102 to transmit and receive electromagnetic signals. As also described further below, isolation barriers 170 separate and isolate transmit and receive portions of munition antenna system 102.

Still referring to FIG. 3, substrate 172 with transmit and receive antenna systems 174 and 176 is positioned around cylindrical portion 144, between top portion 154 and bottom portion 156, and above surface 158 of base portion 142.

Substrate 172 at bottom surface 184 is separated from top surface 158 of bottom plate 142 by a distance d2. Generally, distance d2 is determined based on the predetermined operating (transmission or receiving) frequency $f_0$. In one such embodiment, distance d2 is equal to, or approximately equal to, one-quarter of a wavelength of frequency $f_0$ ($\lambda_0/4$). As such, in an embodiment, distance d2 may be the same as, or substantially the same as, d1, which also may be optimized to be $\lambda_0/4$.

Distance d2 may alternately be defined as a distance from top surface 158 to bottom transmit antenna portion 174*b*, to top transmit antenna portion 174*a*, to bottom receive antenna portion 176*b*, to top receive antenna portion 176*a*, or to a point in substrate 172 that is approximately midway, axially, between top and bottom transmit antenna portions 174, or between top and bottom receive antenna portions 176.

Distance d2 may also be determined in part based on one or more physical characteristics of a height or diameter of cylindrical portion 144, a diameter or thickness of base portion 142, and dimensions of isolation barriers 170.

In an embodiment, distance d2 is less than 50% of a height of cylindrical portion 144 measured from surface 158 to edge 152. In another embodiment, distance d2 is between 5% and 30% of the height of cylindrical portion 144. In an embodiment, distance d2 is between 10 and 20% of the height of cylindrical portion 144.

In an embodiment, an outside diameter of base portion 142 is greater than an outside diameter $A_{OD}$ of substrate 172, such that all portions of substrate 172, including antenna transmit system 174 and antenna receive system 176 are positioned axially above base portion 142. In another embodiment, an outside diameter of base portion 142 is equal to or less than diameter $A_{OD}$. In one such embodiment, antenna transmit and receive systems 174 and 176 are still positioned axially above base portion 142.

In an embodiment, outside diameter $C_{OD}$ of cylindrical portion 144 is approximately the same as inside diameter $A_{ID}$ of substrate 172 (see also, FIG. 4). A curvature defined by outside surface 148 of cylindrical portion 144 is substantially the same as a curvature of inside edge $E_1$ (see also, FIG. 4). Consequently, substrate 172 is in contact with outer surface 148 about edge $E_1$, and is able to fit over and onto cylindrical portion 144. outer diameter $C_{OD}$, in an embodiment, may be slightly larger than inside diameter $A_{ID}$ such that substrate 172 may be fit tightly against cylindrical portion 144 to aid in preventing movement of substrate 172 during launch and flight of munition 100.

In an embodiment, a curvature of one or more conductive segments 174*a*1-5, 174*b*1-5, 167*a*1-5 and 176*b*1-5 are substantially the same as the curvature defined by outside surface 148 of cylindrical portion 144. In such an embodiment, antenna transmit system 174 and antenna receive system 176 are distributed circumferentially about, or wraps around, cylindrical portion 144. In one such embodiment, antenna transmit system 174 is separated from cylindrical portion 144 a same distance at each point as compared to the separation of antenna receive system 176, creating an antenna system symmetry about cylindrical portion 144 of antenna reflector system 230.

Figure 12:
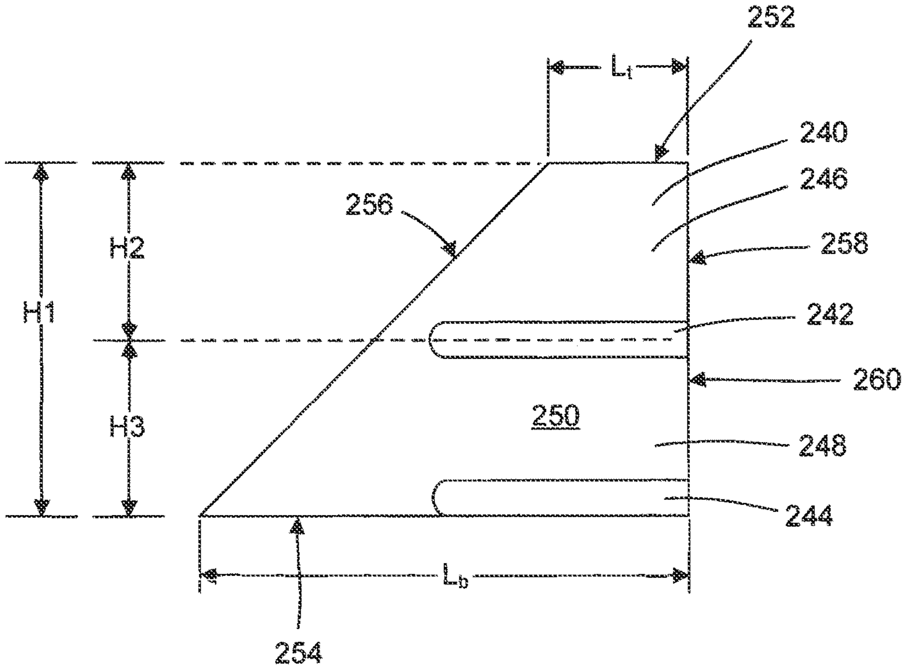
FIG. 12 is a front view of an embodiment of an isolation barrier of the antenna system of FIG. 3.

Referring also to FIG. 12, an embodiment of an isolation septum or barrier 170 is depicted. In an embodiment, isolation barrier 170 includes main or body portion 240 defining slot 242, and one or more support portions or legs 244.

Body portion 240 includes top portion 246, bottom portion 248, first side 250, a second side (same as first side 250, but not depicted), top edge 252, bottom edge 254, distal edge 256, top proximal edge 258 and bottom proximal edge 260. Body portion 240 defines a thickness which in an embodiment defines a width of edges 252 to 260. In an embodiment, the thickness of body portion 240 is relatively small or thin as compared to an axial height or radial width, such that body portion 240 comprises a relatively flat structure. As depicted, body portion 240 is positioned to extend axially upwards in a direction from surface 158 of base portion 142 toward top portion 154 of cylindrical portion 144, and to extend radially in a direction away from surface 148 of cylindrical portion 144.

Isolation barrier 170 and its body portion 240 defines an overall height h1, which is a sum of top portion height h2, defined from a center of slot 242 to top edge 252, and bottom portion height h3, defined from bottom edge 254 to a center of slot 242.

In an embodiment, bottom portion height h3 is the same as distance d2, which is the distance from top surface 158 of base portion 142 to munition antenna system 102, which may be $\lambda_0/4$.

In an embodiment, height h2 is determined based on desired isolation parameters. Depending at least in part upon the operating frequency $f_0$, and dimensions of elements such as substrate 172 and lengths of transmit and receive antenna systems 174 and 176 (which determines their respective distances from isolation barriers 170), a relatively large height h2 will be most effective in isolating antenna systems 174 and 176. As will be described further below, other factors determine an overall isolation function in addition to isolation barrier 170 height h2. In an embodiment, height h2 is equal to, or substantially equal to, height h3, which in an embodiment is approximately $\lambda_0/4$. In other embodiments, h2 may be greater than height h3. In other embodiments, h2 may be less than height h3.

Slot 242 extends radially in a direction from top and bottom proximal edges 258 and 260 toward distal edge 256. An axial height of slot 242 is large enough to receive a portion of substrate 172, such that the axial height of slot 242 is equal to, or in some instances larger than, a thickness of substrate 172. a radial length of slot 242 is long enough to receive a portion of substrate 172, and preferably, long enough to receive an entire width Ws of substrate 172, i.e., is equal to or greater than width Ws of substrate 172 (see also, FIG. 4 for width Ws).

Top length Lt, in an embodiment, is greater than bottom length Lb, such that distal edge 256 is axially inclined. In an embodiment, distal edge 256 inclines at an angle that is the same as, or substantially the same as an angle of inclination of radome 132. In an embodiment, distal edge 256 may be in contact with an inside surface of radome 132 so as to increase positional stability of munition antenna system 102 during launch and flight.

When assembled, top and bottom proximal edges 258 and 260 are proximal to surface 148 of cylindrical portion 144. Top and bottom proximal edges 258 and 260 may be in contact with surface 148 so as to maximize isolation between antenna systems 174 and 176. In an embodiment, edges isolation barrier 170 is adhered to surface 148 at edges 258 and 260 via an adhesive.

Supports 244, extend transversely from first side 250 and the second side and function to support and stabilize body portion 240. Bottom surfaces of supports 244 are in contact with top surface 158. In an embodiment, isolation barrier 170 comprises two supports 244, one extending form first side 250, and another extending from the second side.

Although a specific structural embodiment of an isolation barrier 170 is depicted and described herein, it will be understood that other structures having different shapes and sizes may be used to separate, and therefore isolate, antenna systems 174 and 176.

In an embodiment, isolation barriers 170 comprise a material that generally absorbs, rather than reflects radiation from transmit antenna system 174 and receive antenna system 176, i.e., a radiation-absorbent material. Such radiation-absorbent materials may comprise lossy material, such as Mu metals, iron-loaded silicon, carbon-loaded form ferrite-loaded silicon, and so on.

In an embodiment of, in addition to, or instead of, isolation barriers 170, munition antenna system 102 may include additional lossy material placed between bottom surface 184 of substrate 172 and top surface 158 of base portion 142. In such an embodiment, the lossy material may fill in all or a portion of the space between bottom surface 184 and top surface 158. As such, substrate 172 is supported by, and to a certain extent, cushioned by, the additional lossy material, which may absorb mechanical forces imparted on munition antenna system 102 during munition launch.

Figure 13:
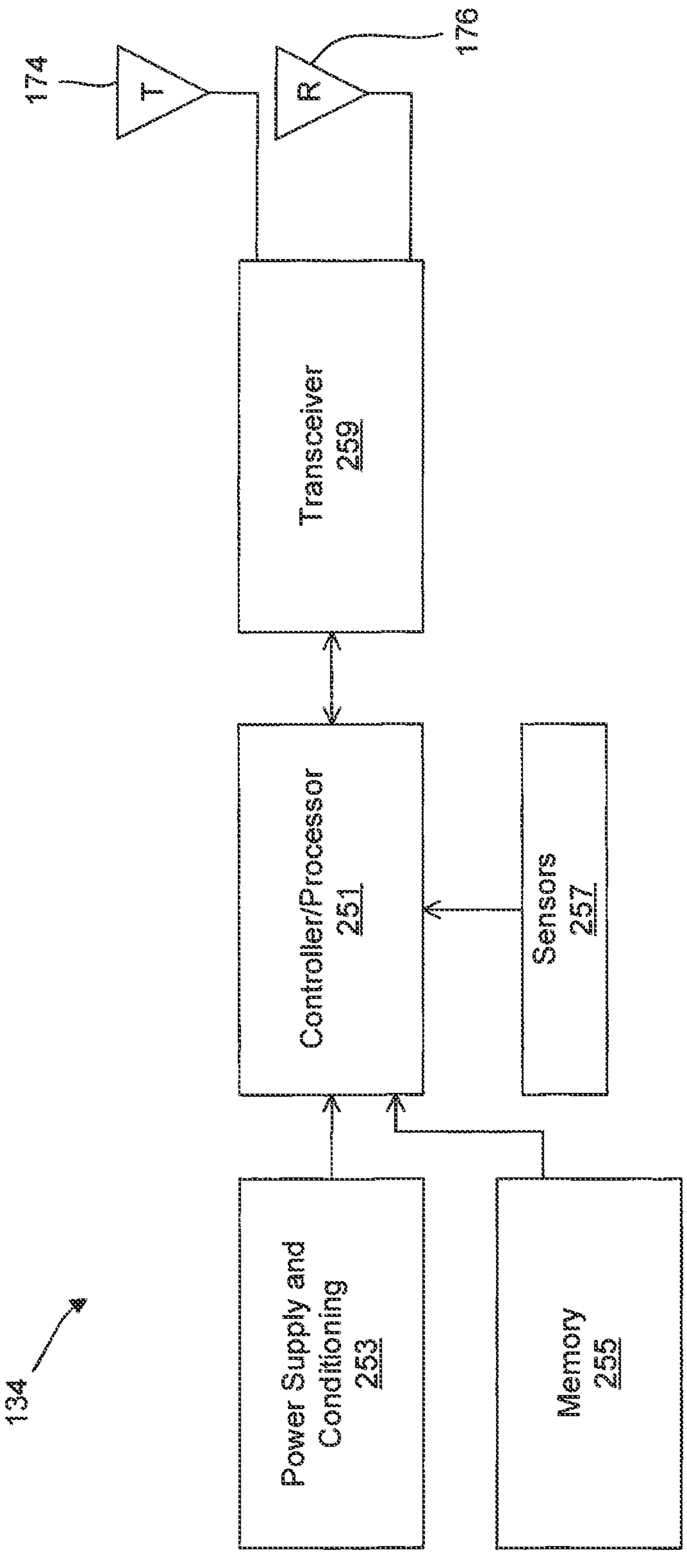
FIG. 13 is a simplified schematic diagram of a munition guidance system, according to an embodiment.

Referring to FIG. 13, a simplified schematic of a portion of munition guidance system 134 is depicted. In an embodiment, munition guidance system 134 includes controller/processor 250 receiving power from power supply and conditioning circuitry 252, and in communication with memory 254. Controller/processor 250 receives input from sensors 256, and communicates with transceiver 258, which may comprise transmit antenna system 174 and receive antenna system. Transmit antenna system 174 transmits signals at a predetermined transmit frequency, which in an embodiment is $f_0$, and receive antenna system 176 receives signals at a predetermined receive frequency, which in an embodiment may also be frequency $f_0$.

Referring also to FIGS. 3 and 7, in basic operation, controller 250 causes a transmit signal at a frequency $f_0$ to be sent to transceiver 258. The transmit signal is fed via feedline 210 to transmit antenna system 174. The dipole antenna arms of transmit antenna system 174, namely top transmit arm 174$a$1 and bottom transmit arm 174$b$1 radiate an electromagnetic signal at frequency $f_0$.

Munition antenna system 102 transmit and receive functionality are improved by positioning the respective transmit and receive antenna systems 174 and 176 as described above, to cause cylindrical portion 144 and plate portion 142 to function as antenna reflector system 230. In the embodiment, depicted, antenna reflector system 230 functions as a corner reflector, boosting gain and bandwidth of antenna systems 174 and 176.

However, unlike typical known antenna systems that include reflectors, such as a corner reflector comprising a pair of flat reflectors, or a convex parabolic reflector, the reflector system of the present invention comprises a unique corner reflector that comprises a flat radially/horizontally-extending surface, e.g., surface 158 of plate 142, and an axially/vertically-extending convex curved surface, e.g., surface 148 of cylindrical portion 158. Further, as described above, to accommodate the convex nature of curved surface 148 of antenna reflector system 230 and improve overall reflectivity and ultimately gain, the antenna arms, and even baluns, are curved to match the curvature of the reflective surface 148 of the SAL, as described above.

In addition to the use of SAL components to form a reflector system, munition antenna system 102 further improves performance characteristics through the compact design of antenna systems 174 and 176, and through the use of an isolating barrier system that includes placement of isolation barriers 170 between the antenna systems.

While much of the radiated signal from munition antenna system 102 may be transmitted in an axial direction, which is generally a munition 100 tail-to-nose direction, some portion of the radiated signal is emitted radially, or transverse to axis A, which may be received by receive antenna system 176, thereby coupling transmit antenna system 174 to receive antenna system 176. The coupling of the antenna systems 174 and 176 typically produces undesirable effects for the radar system, such as decreasing the isolation between transmit and receive channels, which can produce undesirable consequences such as false targets for the radar system.

However, with munition antenna system 102, isolation barriers 170 reduce the coupling of transmit and receive antennas 174 and 176 by absorbing portions of radially-emitted energy.

In an embodiment, a maximum arc-length of transmit antenna system 174 and/or transmit antenna system 174 is less than one-half the circumference of the SAL housing 144, such that when the antenna systems 174 and 176 are opposite one another, there is no open-air path from antenna system 174 to antenna system 176, even without isolation barriers 170.

Figure 14:
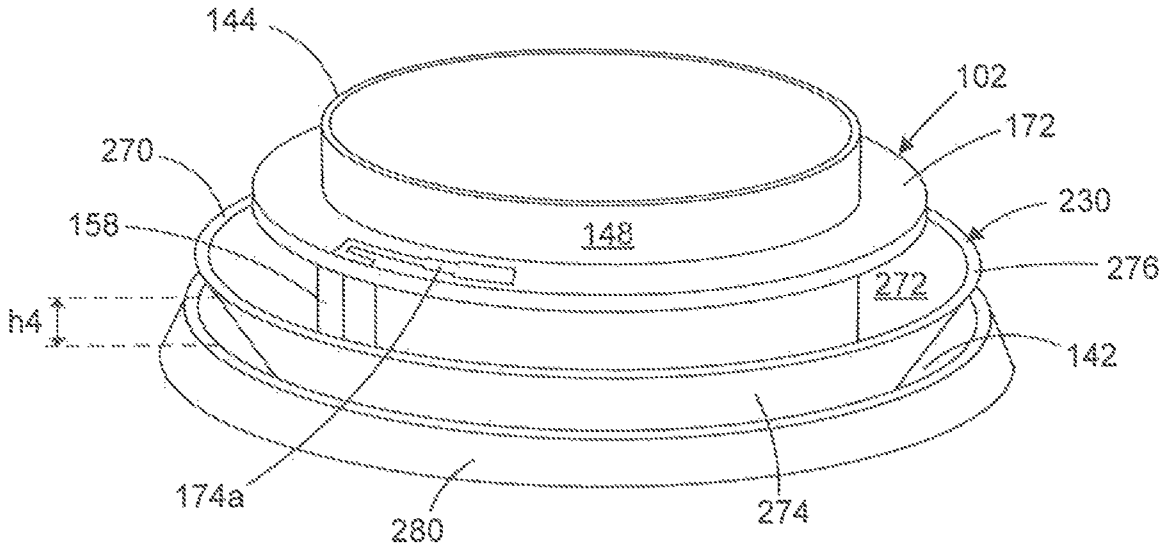
FIG. 14 is a perspective view of an antenna reflector system that utilizes portions of a SAL, according to an embodiment.
Figure 15:
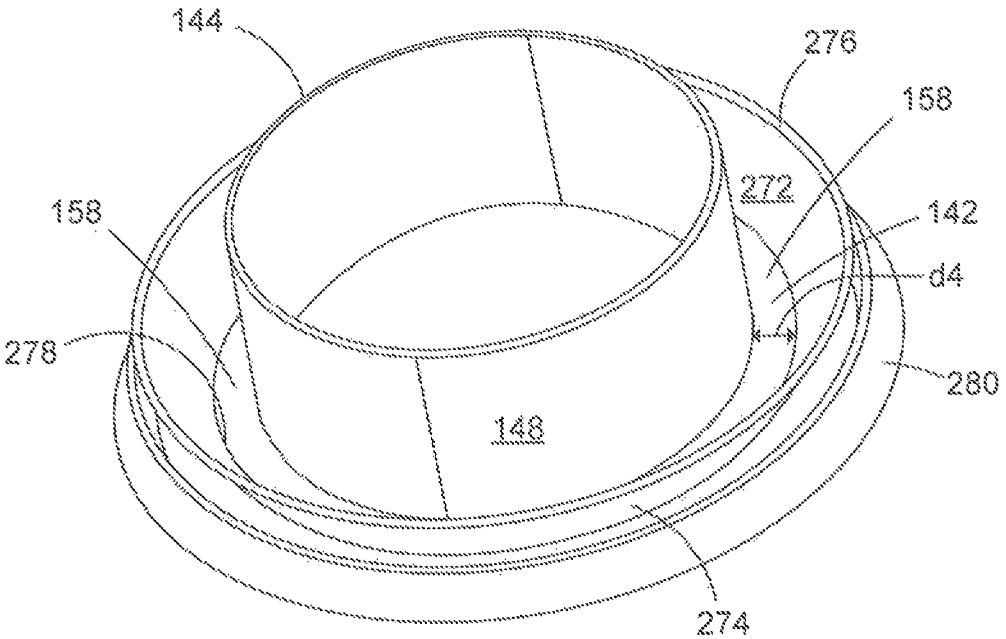
FIG. 15 is a perspective view of the antenna reflector system of FIG. 14.

Referring to FIGS. 14-15, an alternate embodiments of reflector system 230 is depicted. In this embodiment, antenna reflector system 230 includes not only base portion 142 and cylindrical portion 144, but also includes reflector portion 270, which in an embodiment is a frustoconical structure. In the embodiment depicted in FIG. 14, antenna system 102, having a pair of dipole antennas, as described above is depicted in combination with reflector system 230.

Figure 16:
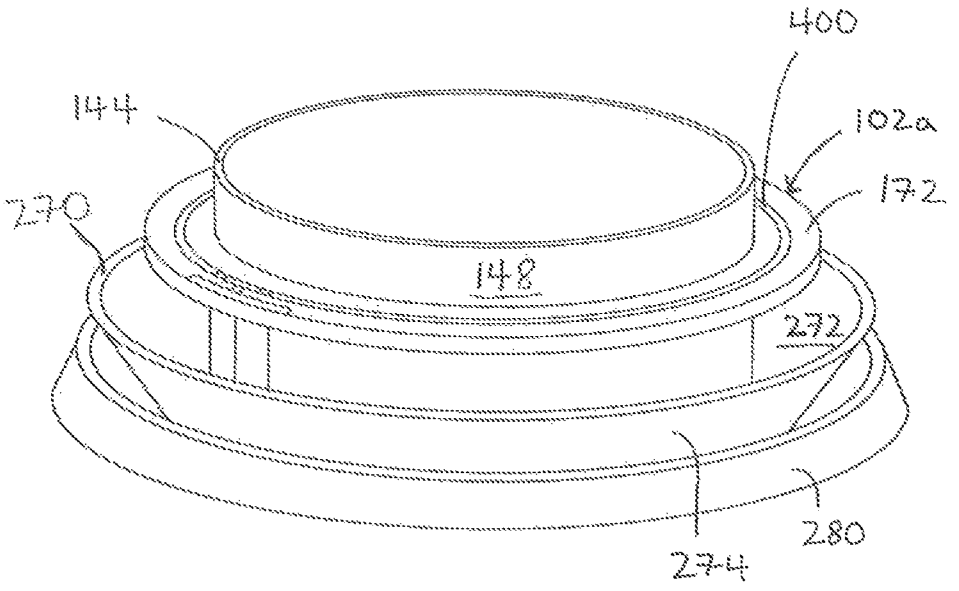
FIG. 16 is a perspective view of a top-loaded monopole antenna with the reflector system of FIG. 15.

Referring specifically to FIG. 14 which depicts a front perspective view of antenna reflector system 230 with munition antenna system 102 mounted to cylindrical portion 144, and to FIG. 15 which depicts another perspective view of antenna reflector system 230 without munition antenna system 102. In the embodiment of FIGS. 14-16, munition antenna system 102 may comprise transmit and receive antenna systems 174 and 176, each comprising a dipole antenna, as described above with respect to FIGS. 4-12. However, antenna reflector system 230 of FIGS. 14-16 may also be used with other types of munition antenna systems 102, such as a munition antenna system 102 that includes a single dipole antenna and no isolation barriers.

In an embodiment, reflector portion 270 comprises a frustocontical structure, resembling a portion of a cone with its tip cut off. Reflector portion 270 includes inside curved surface 272, outside curved surface 274, upper edge 276 and lower edge 278. A maximum diameter of reflector portion 270 is defined by upper edge 276, and a minimum diameter of reflector portion 270 is defined by lower edge 278. In an embodiment a minimum diameter of reflector portion 270 is less than an outside diameter of plate 142.

When assembled into nose section 108 of munition 100 (see also, FIG. 1), reflector antenna portion 270 is mounted to surface 158, such that inner edge 278 is adjacent surface 158. Reflector 270 circumferentially surrounds cylindrical portion 144, with inside surface 272 confronting outside surface 148 of cylindrical portion 144. Outside surface 274 confronts a portion of surface 158 and a nose-section ring 280.

An angle formed between planar surface 158 and inside surface 272 is generally obtuse, such that it is greater than 90 degrees. In an embodiment, the angle formed between planar surface 158 and inside surface 272 ranges from 90 degrees to 179 degrees. In another embodiment, the angle formed between planar surface 158 and inside surface 272 ranges from 100 degrees to 150 degrees. In an embodiment, the angle formed between planar surface 158 and inside surface 272 ranges from 110 degrees to 125 degrees. As the angle formed between planar surface 158 and inside surface 272 approaches 90 degrees, the more radiation will be emitted in an axial direction. The angle between planar surface 158 and inside surface 272 may be adjusted based on frequency and desired direction of radiation.

Bottom edge 278 is located a distance d4 from cylindrical portion 144. In an embodiment, distance d4 is approximately half the distance from cylindrical portion 144 to ring 280. In addition to adjusting the angle formed between planar surface 158 and inside surface 272, distance d4 is also adjustable. Adjustments in distance d4 may be made in combination with the angle between planar surface 158 and inside surface 272 based on desired frequency and directivity characteristics.

Height h4 of reflector portion 270, in an embodiment, is such that reflector portion 270 lies axially below all portions of substrate 172. Height h4 may also be adjusted in combination with d4 and the angle formed between planar surface 158 and inside surface 272, based on frequency used and desired radiation direction.

Referring to FIG. 16, in another embodiment, antenna system 230 may be combined with an alternative embodiment of antenna system 102, namely antenna system 102$a$. As described above, antenna system 102 may comprise one or more dipole antennas. In the embodiment of FIG. 16, antenna system 102$a$ comprises a top-loaded monopole antenna. In this embodiment, antenna conductive portion 400 on a top side of substrate 172 completely encircles cylindrical portion 144. The reflector system, system 230 is substantially that same as described above with respect to FIGS. 14 and 15.

Figure 17:
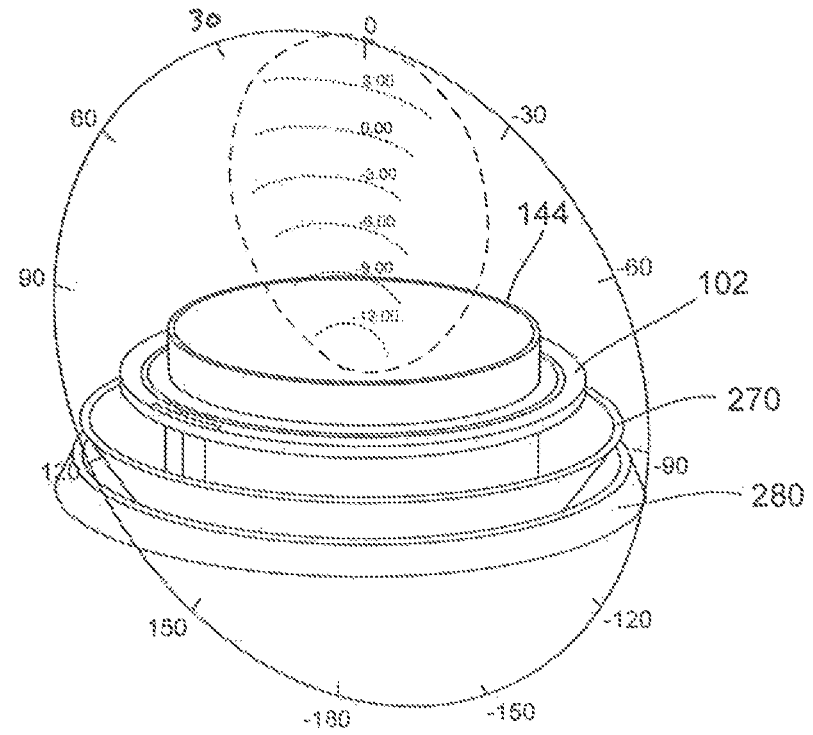
FIG. 17 is a perspective view of an antenna surrounding a SAL with an antenna reflector as depicted in FIG. 16, overlaid with an antenna performance chart.

Referring to FIG. 17, a theoretical gain chart is depicted overlaying antenna reflector system 230 with the top-loaded monopole antenna 400 of FIG. 16. As depicted, end-firing is optimized. A standard monopole has a well known gain of about 5.19 dBi, and typically a null straight above it, in this configuration, the monopole is top loaded with a cylindrical board and conductive surface, introduced into an environment with a parabolic reflector, and it can be seen the peak gain is straight above the antenna with about 6 dBi of gain.

Figure 18:
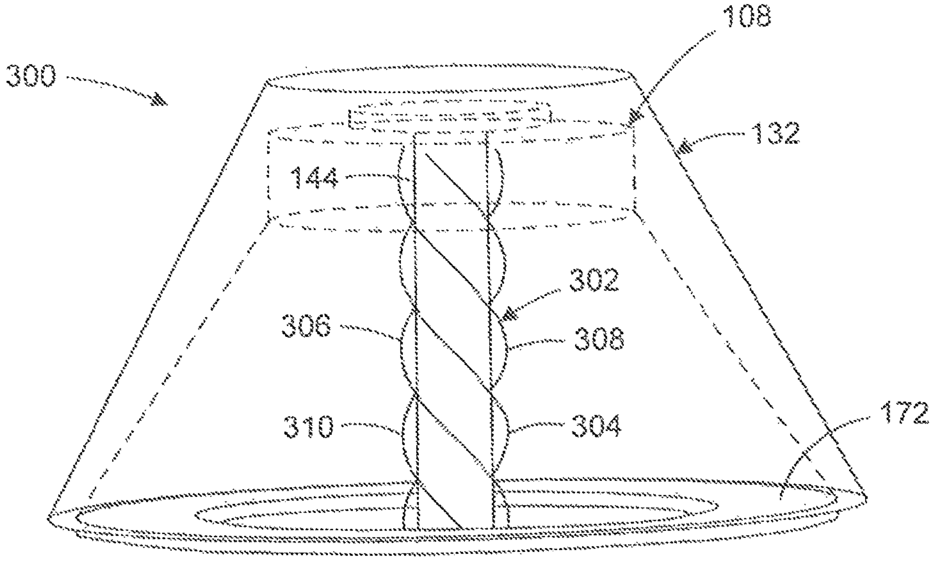
FIG. 18 is a quadrifilar helix antenna system within a SAL, in a nose portion of a munition, according to an embodiment.
Figure 19:
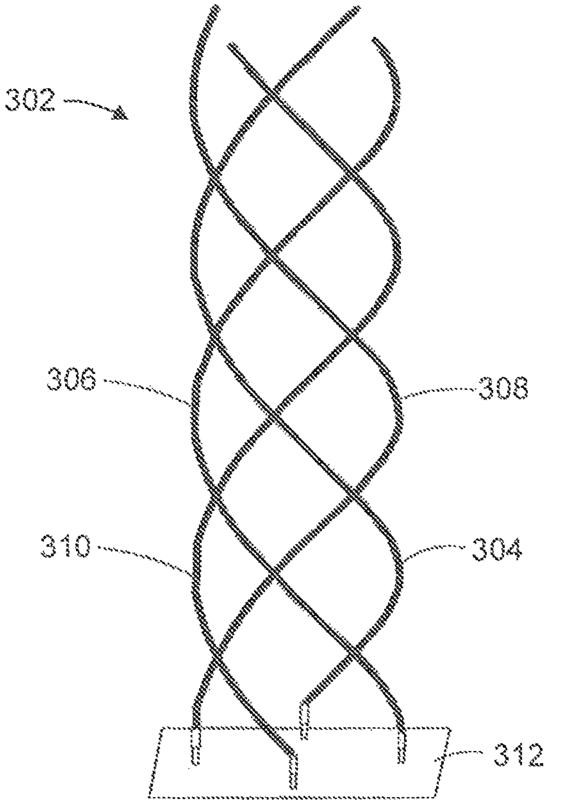
FIG. 19 is a front, perspective view of the quadrifilar helical antenna system of FIG. 18.

Referring to FIGS. 18 and 19, an antenna system 300 for mounting within a nose section of a munition 100 is depicted. In this embodiment, helical antenna system 300 is similar to munition antenna system 102, but comprises a quadrifilar helix antenna, rather than a pair of dipole antennas.

Referring specifically to FIG. 19, quadrifilar helix antenna assembly 302 is depicted. Quadrifilar helix antenna assembly 302, in the embodiment depicted, includes four helically-wound metal wire loops, wire loops 304, 306, 308 and 310, in communication with ground plane 312.

Each of the four helically-wound wire loops 304 to 310 is wound spirally, or helically upwards from ground plane 312. In an embodiment, wire loops 304 to 310 are distributed equidistantly from one another. A pitch or wrap rate of each of wire loops 304 to 310, in an embodiment, is approximately the same. Further the pitch of the wire loops may vary from antenna to antenna based on desired operating frequencies and other performance characteristics.

Referring also to FIG. 18, quadrifilar helix antenna assembly 302 is mounted or located within nose section 108 of munition 100 (see also, FIG. 1), under radome 132. Antenna system 300 is integrated into a SAL of munition 100, with each wire loop 304, 306, 308 and 310 being wound about cylindrical portion 144, though not in contact with cylindrical portion 144. In an embodiment, cylindrical portion 144 may comprise a portion of a SAL housing as described above with respect to munition antenna system 102.

In addition to quadrifilar antenna assembly 302, helical antenna system 300 may also comprise a ring-shaped substrate 172. Additional electronic components may be mounted to substrate 172, which may be in communication with wire loops 304 to 310.

Additional information on quadrifilar antennas and antenna systems are described in Steven D. Keller, et al., *Quadirfilar Helix Antenna for Enhanced Air-to-Ground Communications*, US Army Research Laboratory, ARL-TR-79, May 2016, and Bill Slade, The Basics of Quadrifilar Helix Antennas, www.orbanmicrowave.com, 2015, both of which are incorporated by reference herein in their entireties.

Figure 20:
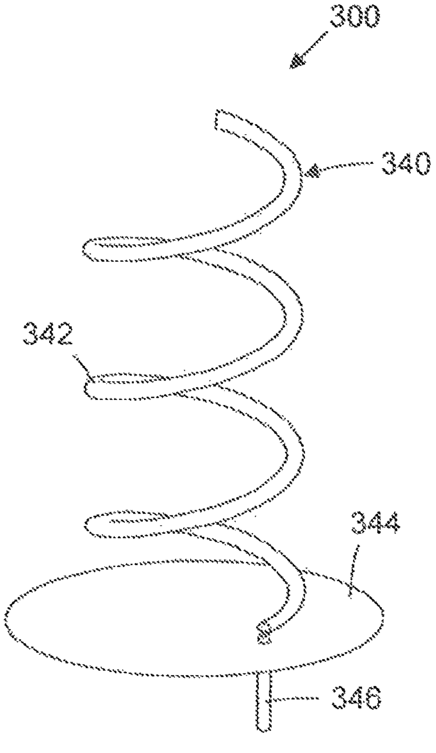
FIG. 20 is an embodiment of a single-helix antenna system, according to an embodiment of the disclosure.

Referring to FIG. 20, an alternate embodiment of helical antenna system 300 includes a single-helix antenna assembly 340. In this alternate embodiment, helical antenna system 300 includes single-helix antenna assembly 340 that is located in nose section 108, and mounted about a SAL housing, such as cylindrical portion 144.

However, in this embodiment, helical antenna system 300 includes a single helical wire loop, wire loop 342, which is connected to ground plane 344, and feed line 346.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed:

1. A system for mounting in a nose section of a munition, comprising:

a guidance system defining a central axis and having a circumference and an outside surface;

a substrate having an inner edge and an outer edge and including a top surface and a bottom surface, and positioned adjacent to the outside surface of the guidance system; and an antenna system including:

a first plurality of conductive segments positioned on the top surface of the substrate at a first radial distance from the inside edge of the substrate, one or more of the first plurality of conductive segments comprising curved conductive segments defining a first curvature; and a second plurality of conductive segments positioned on the bottom surface of the substrate at a second radial distance from the inside edge of the substrate, one or more of the second plurality of conductive segments comprising curved conductive segments defining a second curvature, the second plurality of conductive segments positioned axially below the first plurality of conductive segments, such that a portion of the first plurality of conductive segments overlies a portion of the second plurality of conductive segments.

2. The system of claim 1, wherein the system comprises a dipole antenna.

3. The system of claim 1, wherein the system comprises a monopole antenna.

4. The system of claim 1, wherein the second plurality of conductive segments includes a ground plane.

5. The system of claim 1, wherein the first curvature is the same as a curvature defined by the outside surface of the guidance system.

6. The system of claim 1, wherein the first curvature is closer to the outer edge than to the inner edge of the substrate.

7. The system of claim 1, wherein the substrate is in contact with the outside surface of the guidance system.

8. The system of claim 7, wherein the substrate is ring-shaped.

9. The system of claim 1, wherein the guidance system is a semi-active laser (SAL) system.

10. The system of claim 1, wherein during operation, the system is configured to radiate energy off of the outside surface of the guidance system.

11. The system of claim 1, further comprising:

a second antenna system on a second portion of the substrate, comprising:

a third plurality of conductive segments positioned on the top surface of the substrate at the first radial distance from the inside edge of the substrate, one or more of the third plurality of conductive segments comprising curved conductive segments having the first curvature; and a fourth plurality of conductive segments positioned on the bottom surface of the substrate at the second radial distance from the inside edge of the substrate, one or more of the fourth plurality of conductive segments comprising curved conductive segments defining the second curvature, the fourth plurality of conductive segments positioned axially below the third plurality of conductive segments, such that a portion of the third plurality of conductive segments overlies a portion of the fourth plurality of conductive segments.

12. The system of claim 11, wherein the antenna system is an antenna transmit system and the second system is an antenna receive system.

13. The system of claim 12, wherein the antenna transmit system is positioned on the substrate radially opposite the antenna receive system, relative to the central axis.

14. The system of claim 12, further comprising a plurality of isolation barriers configured to separate and isolate the antenna transmit system and the antenna receive system.

15. The system of claim 1, wherein the guidance system includes a metal cylindrical portion that defines the circumference and the outside surface.

16. The system of claim 1, wherein the first plurality of conductive segments and the second plurality of conductive segments are fed via a feedline.

17. The system of claim 16, wherein the feedline extends through the substrate and connects the first and second plurality of conductive segments.

* * * * *